United States Patent
Gordon et al.

(10) Patent No.: US 11,591,453 B2
(45) Date of Patent: *Feb. 28, 2023

(54) FIBROUS STRUCTURES EXHIBITING IMPROVED WHITENESS INDEX VALUES

(71) Applicant: The Procter & Gamble Company, Cincinnati, OH (US)

(72) Inventors: Gregory Charles Gordon, Loveland, OH (US); Jacqueline Besinaiz Thomas, Oregonia, OH (US); Elaine Marie Suszcynsky-Meister, Okeana, OH (US); Mark Robert Sivik, Mason, OH (US); Gregory Scot Miracle, Liberty Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 11 days.

This patent is subject to a terminal disclaimer.

(21) Appl. No.: 17/403,940

(22) Filed: Aug. 17, 2021

(65) Prior Publication Data

US 2021/0380783 A1 Dec. 9, 2021

Related U.S. Application Data

(63) Continuation of application No. 14/247,544, filed on Apr. 8, 2014, now Pat. No. 11,091,606.

(Continued)

(51) Int. Cl.
*C08L 3/02* (2006.01)
*D04H 3/013* (2012.01)
(Continued)

(52) U.S. Cl.
CPC ............ *C08L 3/02* (2013.01); *C08L 1/02* (2013.01); *C08L 1/286* (2013.01); *D01F 1/06* (2013.01); *D01F 2/00* (2013.01); *D04H 1/425* (2013.01); *D04H 1/43838* (2020.05); *D04H 3/00* (2013.01); *D04H 3/007* (2013.01); *D04H 3/009* (2013.01); *D04H 3/013* (2013.01);
(Continued)

(58) Field of Classification Search
CPC ....... C08L 3/02; Y10T 428/31909; D01F 1/06
USPC ........................................................ 428/401
See application file for complete search history.

(56) References Cited

U.S. PATENT DOCUMENTS

| | | |
|---|---|---|
| 3,542,634 A | 11/1970 | Such et al. |
| 3,737,368 A | 6/1973 | Such et al. |
| 3,948,600 A | 4/1976 | Reinhardt et al. |
| 5,853,547 A | 12/1998 | Ahrens et al. |
| 6,079,526 A | 6/2000 | Nezu et al. |
| 7,947,766 B2 | 5/2011 | Heinzman et al. |
| 8,129,449 B2 | 3/2012 | Heinzman et al. |

(Continued)

FOREIGN PATENT DOCUMENTS

| | | |
|---|---|---|
| JP | S52155218 A | 12/1977 |
| JP | H07109617 A | 4/1995 |

(Continued)

OTHER PUBLICATIONS

12830-JC PCT Search Report and Written Opinion for PCTUS2014/032346 dated Jul. 15, 2014; 10 pages.

(Continued)

*Primary Examiner* — Peter Y Choi
(74) *Attorney, Agent, or Firm* — C. Brant Cook

(57) ABSTRACT

Fibrous structures, for example sanitary tissue products, containing a plurality of filaments that employ one or more filament-forming materials, such as one or more hydroxyl polymers, and one or more hueing agents, present within the filaments such that the fibrous structures exhibit a Whiteness Index of greater than 72 as measured according to the Whiteness Index Test Method described herein.

20 Claims, 8 Drawing Sheets

Related U.S. Application Data

(60) Provisional application No. 61/811,279, filed on Apr. 12, 2013.

(51) Int. Cl.

| | | |
|---|---|---|
| *D04H 3/16* | (2006.01) | |
| *D01F 2/00* | (2006.01) | |
| *D04H 3/007* | (2012.01) | |
| *D01F 1/06* | (2006.01) | |
| *D04H 3/009* | (2012.01) | |
| *D04H 3/00* | (2012.01) | |
| *C08L 1/28* | (2006.01) | |
| *C08L 1/02* | (2006.01) | |
| *D04H 1/425* | (2012.01) | |
| *D04H 1/4382* | (2012.01) | |

(52) U.S. Cl.
CPC ............ *D04H 3/16* (2013.01); *D04H 1/4383* (2020.05); *D04H 1/43828* (2020.05); *D04H 1/43832* (2020.05); *Y10T 428/298* (2015.01); *Y10T 428/31909* (2015.04)

(56) References Cited

U.S. PATENT DOCUMENTS

| | | |
|---|---|---|
| 2003/0211801 A1 | 11/2003 | Putnam et al. |
| 2005/0137330 A1 | 6/2005 | Forshey et al. |
| 2006/0134410 A1 | 6/2006 | Mackey et al. |
| 2006/0275347 A1 | 12/2006 | Evers et al. |
| 2009/0025894 A1 | 1/2009 | Barnholtz et al. |
| 2011/0039074 A1 | 2/2011 | Cabell et al. |
| 2011/0039469 A1 | 2/2011 | Cabell et al. |
| 2011/0151738 A1 | 6/2011 | Moore et al. |
| 2012/0052036 A1 | 3/2012 | Glenn, Jr. |
| 2012/0052037 A1 | 3/2012 | Sivik et al. |
| 2014/0308518 A1 | 10/2014 | Gordon et al. |

FOREIGN PATENT DOCUMENTS

| | | |
|---|---|---|
| WO | 9946119 A1 | 9/1999 |
| WO | 03014217 A1 | 2/2003 |

OTHER PUBLICATIONS

All Office Actions, U.S. Appl. No. 14/247,544, filed Apr. 8, 2014.

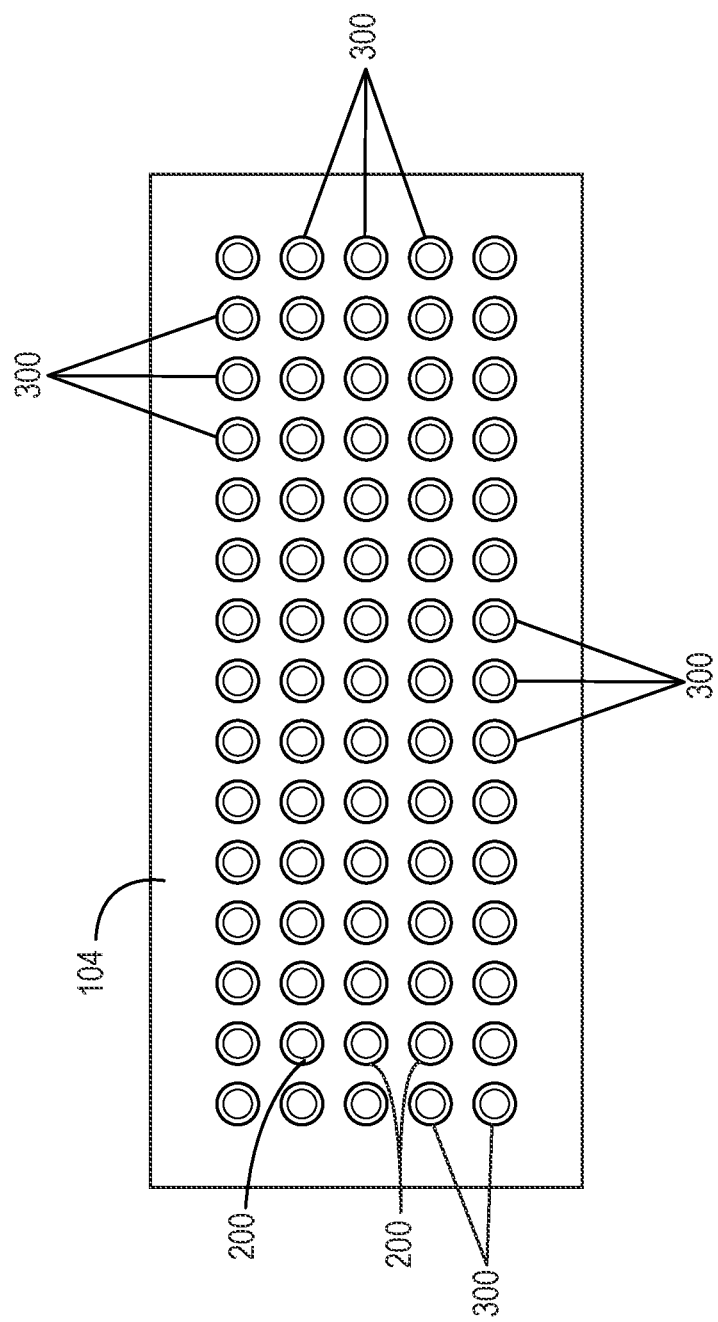

FIBROUS STRUCTURES EXHIBITING IMPROVED WHITENESS INDEX VALUES

FIELD OF THE INVENTION

The present invention relates to fibrous structures, for example sanitary tissue products, and more particularly to fibrous structures comprising a plurality of filaments that comprise one or more filament-forming materials, such as one or more hydroxyl polymers, and one or more hueing agents, present within the filaments such that the fibrous structures exhibit a Whiteness Index of greater than 72 as measured according to the Whiteness Index Test Method described herein.

BACKGROUND OF THE INVENTION

Fibrous structures comprising filaments that comprise one or more active agents, such as fabric hueing agents, that produce an intended effect in an environment external to the filaments are known. However, such fabric hueing agents are present at relatively high levels designed to provide hueing benefits to fabrics being treated during a laundering operation when the fabric hueing agents are released from the filaments. In addition, the fabric hueing agents do not provide its filaments and thus its fibrous structure a hueing benefit during use of the fibrous structure by a consumer because the hueing agents are released from the filaments during use when the filaments are solubilized during a laundering operation. In addition to the above known fibrous structures, fibrous structures comprising hydroxyl polymer filaments useful as sanitary tissue products are known in the art. Such fibrous structures and/or sanitary tissue products exhibit Whiteness Indices of less than 71 as measured according to the Whiteness Index Test Method described herein. Even though such known sanitary tissue products are functionally suitable for their intended use, consumers of such sanitary tissue products desire sanitary tissue products having greater Whiteness Index values from these known sanitary tissue products whose filaments are void of hueing agents.

A problem faced by formulators is how to make a fibrous structure comprising a plurality of filaments containing filament-forming polymers, such as starch, exhibit a Whiteness Index of greater than 72 as measured according to the Whiteness Index Test Method described herein.

It is clear that none of the known prior art fibrous structures comprise a hueing agent within its filaments such that the resulting fibrous structure exhibits a Whiteness Index of greater than 72 as measured according to the Whiteness Index Test Method described herein.

Accordingly, there is a need for a fibrous structure, for example a sanitary tissue product comprising a fibrous structure, comprising a plurality of filaments that comprise a filament-forming polymer, such as starch, wherein the fibrous structure exhibits a Whiteness Index of greater than 72 as measured according to the Whiteness Index Test Method described herein and methods for making same.

SUMMARY OF THE INVENTION

The present invention fulfills the need described above by providing a sanitary tissue product comprising a fibrous structure comprising a plurality of filaments that comprise a filament-forming polymer, such as starch, wherein the fibrous structure exhibits a Whiteness Index of greater than 72 as measured according to the Whiteness Index Test Method described herein and methods for making same.

A solution to the problem described above is to include one or more hueing agents within the filaments of a fibrous structure to provide the fibrous structure and/or sanitary tissue product comprising the fibrous structure with a Whiteness Index of greater than 72 as measured according to the Whiteness Index Test Method described herein.

It has unexpectedly been found that fibrous structures comprising filaments comprising one or more hueing agents results in the fibrous structures exhibiting a Whiteness Index of greater than 72 as measured according to the Whiteness Index Test Method described herein. It has been found that filaments comprising relatively high levels, such as active agent levels, for example greater than 5% and/or greater than 3% and/or greater than 1% by weight on a dry filament basis, of fabric hueing agents may result in over hueing of the filaments and/or fibrous structure comprising the filaments, resulting in a non-white color, for example a blue, purple, or red color and thus a Whiteness Index of less than 72 and/or an L-value of the fibrous structure that is significantly lower than the L-value of the fibrous structure void of the hueing agents. In one example, the L-value of the filaments and/or fibrous structures of the present invention are at least 60 and/or at least 75 and/or at least 88 to about 100. In another example, the L-value of the filaments and/or fibrous structures of the present invention are from about 60 to about 100 and/or from about 75 to about 98 and/or from about 88 to about 96. Likewise, no and/or too little (for example less than 0.00001% by weight on a dry filament basis) of hueing agents within the filaments of a fibrous structure results in a Whiteness Index of less than 72.

In one example of the present invention, a fibrous structure comprising a plurality of filaments comprising one or more filament-forming polymers and one or more hueing agents present within the filaments, wherein the fibrous structure exhibits a Whiteness Index of greater than 72 as measured by the Whiteness Index Test Method, is provided.

In another example of the present invention, a method for making a fibrous structure and/or sanitary tissue product comprising a fibrous structure according to the present invention, wherein the method comprises the steps of:

a. providing a polymer melt composition comprising one or more filament-forming polymers and one or more hueing agents;

b. producing a plurality of filaments from the polymer melt composition;

c. collecting the filaments on a collection device (for example a patterned belt that imparts a three-dimensional pattern to at least one surface of the fibrous structure) such that a fibrous structure is formed; and d. optionally, converting the fibrous structure to a sanitary tissue product according to the present invention;

e. optionally, adding a plurality of pulp fibers to the fibrous structure;

f. optionally, imparting a thermal bond pattern to the fibrous structure; and g. optionally, embossing the fibrous structure.

The present invention fulfills the needs described above by providing fibrous structures comprising filaments that contain one or more hueing agents such that the fibrous structures exhibit a Whiteness Index of greater than 72 as measured according to the Whiteness Index Test Method described herein.

BRIEF DESCRIPTION OF THE DRAWINGS

FIG. 9 is a view similar to that of FIG. 8 and showing one possible arrangement of orifices for providing a boundary air around the attenuation zone shown in FIG. 7.

DETAILED DESCRIPTION OF THE INVENTION

Definitions

Figure 1:
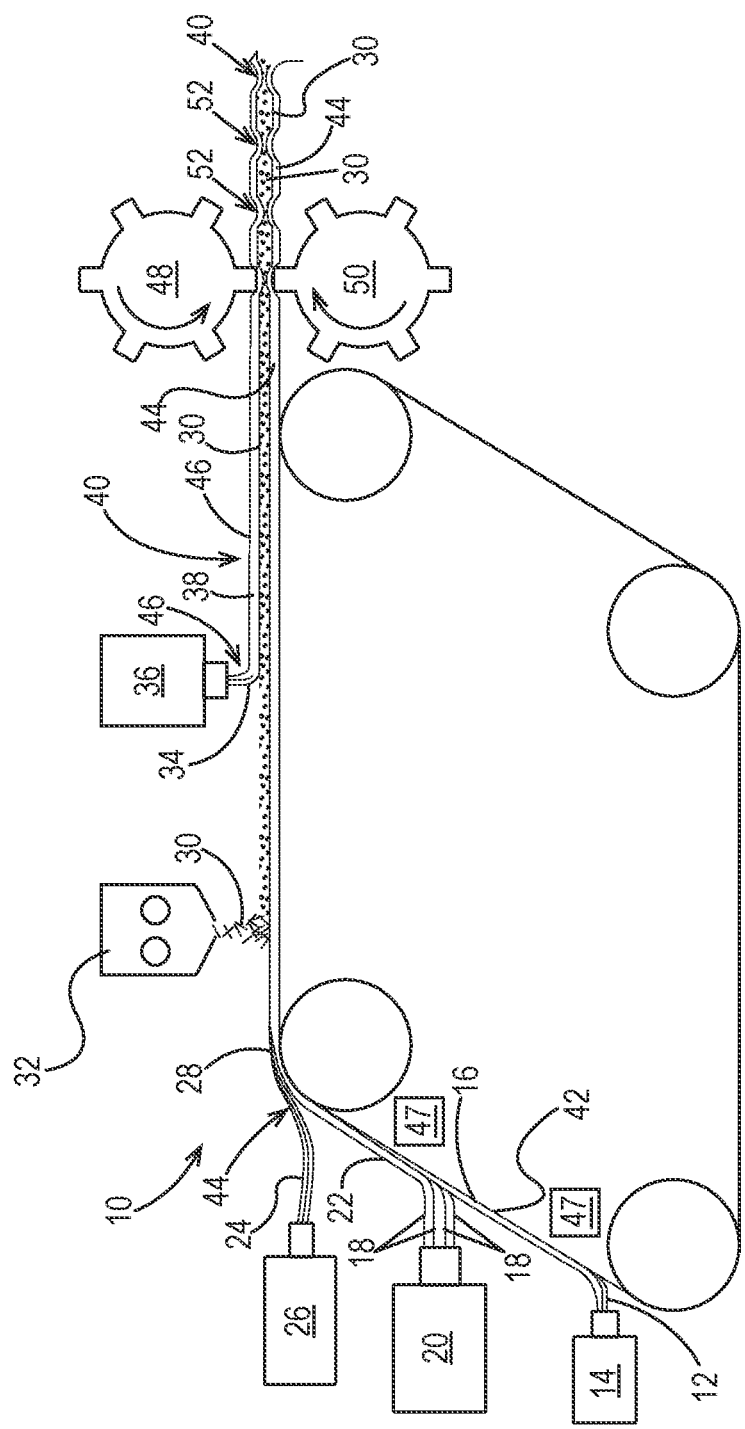
FIG. 1 is a schematic representation of one example of a method for making a fibrous structure according to the present invention.

"Fibrous structure" as used herein means a structure that comprises one or more fibrous elements. In one example, a fibrous structure according to the present invention means an association of fibrous elements that together form a structure capable of performing a function.

The fibrous structures of the present invention may be homogeneous or may be layered. If layered, the fibrous structures may comprise at least two and/or at least three and/or at least four and/or at least five and/or at least six and/or at least seven and/or at least 8 and/or at least 9 and/or at least 10 to about 25 and/or to about 20 and/or to about 18 and/or to about 16 layers.

In one example, the fibrous structures of the present invention are disposable. For example, the fibrous structures of the present invention are non-textile fibrous structures. In another example, the fibrous structures of the present invention are flushable, such as toilet tissue.

Non-limiting examples of processes for making fibrous structures include known wet-laid papermaking processes, air-laid papermaking processes, and wet, solution, and dry filament spinning processes, for example meltblowing and spunbonding spinning processes, that are typically referred to as nonwoven processes. Further processing of the formed fibrous structure may be carried out such that a finished fibrous structure is formed. For example, in typical papermaking processes, the finished fibrous structure is the fibrous structure that is wound on the reel at the end of papermaking. The finished fibrous structure may subsequently be converted into a finished product, e.g. a sanitary tissue product.

"Fibrous element" as used herein means an elongate particulate having a length greatly exceeding its average diameter, i.e. a length to average diameter ratio of at least about 10. A fibrous element may be a filament or a fiber. In one example, the fibrous element is a single fibrous element rather than a yarn comprising a plurality of fibrous elements.

The fibrous elements of the present invention may be spun from polymer melt compositions via suitable spinning operations, such as meltblowing and/or spunbonding.

The fibrous elements of the present invention may be monocomponent and/or multicomponent. For example, the fibrous elements may comprise bicomponent fibers and/or filaments. The bicomponent fibers and/or filaments may be in any form, such as side-by-side, core and sheath, islands-in-the-sea and the like.

"Filament" as used herein means an elongate particulate as described above that exhibits a length of greater than or equal to 5.08 cm (2 in.) and/or greater than or equal to 7.62 cm (3 in.) and/or greater than or equal to 10.16 cm (4 in.) and/or greater than or equal to 15.24 cm (6 in.).

Filaments are typically considered continuous or substantially continuous in nature. Filaments are relatively longer than fibers. Non-limiting examples of filaments include meltblown and/or spunbond filaments. Non-limiting examples of polymers that can be spun into filaments include natural polymers, such as starch, starch derivatives, cellulose, such as rayon and/or lyocell, and cellulose derivatives, hemicellulose, hemicellulose derivatives, and synthetic polymers including, but not limited to polyvinyl alcohol, thermoplastic polymer, such as polyesters, nylons, polyolefins such as polypropylene filaments, polyethylene filaments, and biodegradable thermoplastic fibers such as polylactic acid filaments, polyhydroxyalkanoate filaments, polyesteramide filaments and polycaprolactone filaments.

"Fiber" as used herein means an elongate particulate as described above that exhibits a length of less than 5.08 cm (2 in.) and/or less than 3.81 cm (1.5 in.) and/or less than 2.54 cm (1 in.).

Fibers are typically considered discontinuous in nature. Non-limiting examples of fibers include pulp fibers, such as wood pulp fibers, and synthetic staple fibers such as polypropylene, polyethylene, polyester, copolymers thereof, rayon, glass fibers and polyvinyl alcohol fibers.

Staple fibers may be produced by spinning a filament tow and then cutting the tow into segments of less than 5.08 cm (2 in.) thus producing fibers.

In one example of the present invention, a fiber may be a naturally occurring fiber, which means it is obtained from a naturally occurring source, such as a vegetative source, for example a tree and/or plant. Such fibers are typically used in papermaking and are oftentimes referred to as papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to fibrous structures made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. Also applicable to the present invention are fibers derived from recycled paper, which may contain any or all of the above categories of fibers as well as other non-fibrous polymers such as fillers, softening agents, wet and dry strength agents, and adhesives used to facilitate the original papermaking.

In addition to the various wood pulp fibers, other cellulosic fibers such as cotton linters, rayon, lyocell, trichome, and bagasse fibers can be used in the fibrous structures of the present invention.

"Sanitary tissue product" as used herein means a soft, relatively low density fibrous structure useful as a wiping implement for post-urinary and post-bowel movement cleaning (toilet tissue), for otorhinolaryngological discharges (facial tissue), multi-functional absorbent and cleaning uses (absorbent towels) and wipes, such as wet and dry wipes. The sanitary tissue product may be convolutedly wound upon itself about a core or without a core to form a sanitary tissue product roll or may be in the form of discrete sheets.

In one example, the sanitary tissue product of the present invention comprises one or more fibrous structures according to the present invention.

The sanitary tissue products and/or fibrous structures of the present invention may exhibit a basis weight between about 1 $g/m^2$ to about 5000 $g/m^2$ and/or from about 10 $g/m^2$ to about 500 $g/m^2$ and/or from about 10 $g/m^2$ to about 300 $g/m^2$ and/or from about 10 $g/m^2$ to about 120 $g/m^2$ and/or from about 15 $g/m^2$ to about 110 $g/m^2$ and/or from about 20 $g/m^2$ to about 100 $g/m^2$ and/or from about 30 to 90 $g/m^2$ as determined by the Basis Weight Test Method described herein. In addition, the sanitary tissue product of the present invention may exhibit a basis weight between about 30 $g/m^2$ to about 110 $g/m^2$ and/or from about 35 $g/m^2$ to about 100 $g/m^2$ and/or from about 40 $g/m^2$ to about 90 $g/m^2$ and/or from about 45 $g/m^2$ to 80 $g/m^2$ as determined by the Basis Weight Test Method described herein.

The sanitary tissue products of the present invention may exhibit a total dry tensile strength of greater than about 59 g/cm and/or from about 100 g/cm and/or from about 200 g/cm and/or from about 300 g/cm to about 1000 g/cm and/or to about 800 g/cm and/or to about 700 g/cm and/or from about 100 g/cm to about 700 g/cm. In addition, the sanitary tissue product of the present invention may exhibit a total dry tensile strength of greater than about 200 g/cm and/or from about 200 g/cm to about 650 g/cm and/or from about 250 g/cm to about 600 g/cm. In one example, the sanitary tissue product exhibits a total dry tensile strength of less than 1000 g/cm and/or less than 800 g/cm.

The sanitary tissue products of the present invention may exhibit an initial total wet tensile strength of less than about 78 g/cm and/or less than about 59 g/cm and/or less than about 39 g/cm and/or less than about 29 g/cm and/or less than about 23 g/cm.

The sanitary tissue products of the present invention may exhibit an initial total wet tensile strength of greater than about 118 g/cm and/or greater than about 157 g/cm and/or greater than about 196 g/cm and/or greater than about 236 g/cm and/or greater than about 276 g/cm and/or greater than about 315 g/cm and/or greater than about 354 g/cm and/or greater than about 394 g/cm and/or from about 118 g/cm to about 1968 g/cm and/or from about 157 g/cm to about 1181 g/cm and/or from about 196 g/cm to about 984 g/cm and/or from about 196 g/cm to about 787 g/cm and/or from about 196 g/cm to about 591 g/cm.

The sanitary tissue products of the present invention may exhibit a density of less than 0.60 $g/cm^3$ and/or less than 0.30 $g/cm^3$ and/or less than 0.20 $g/cm^3$ and/or less than 0.15 $g/cm^3$ and/or less than 0.10 $g/cm^3$ and/or less than 0.07 $g/cm^3$ and/or less than 0.05 $g/cm^3$ and/or from about 0.01 $g/cm^3$ to about 0.20 $g/cm^3$ and/or from about 0.02 $g/cm^3$ to about 0.15 $g/cm^3$ and/or from about 0.02 $g/cm^3$ to about 0.10 $g/cm^3$.

The sanitary tissue products of the present invention may be in the form of sanitary tissue product rolls. Such sanitary tissue product rolls may comprise a plurality of connected, but perforated sheets of fibrous structure, that are separably dispensable from adjacent sheets.

The sanitary tissue products of the present invention may comprise additives such as softening agents, temporary wet strength agents, permanent wet strength agents, bulk softening agents, lotions, silicones, wetting agents, latexes, patterned latexes and other types of additives suitable for inclusion in and/or on sanitary tissue products.

"Hydroxyl polymer" as used herein includes any hydroxyl-containing polymer that can be incorporated into a fibrous structure of the present invention, such as into a fibrous structure in the form of a fibrous element. In one example, the hydroxyl polymer of the present invention includes greater than 10% and/or greater than 20% and/or greater than 25% by weight hydroxyl moieties. In another example, the hydroxyl within the hydroxyl-containing polymer is not part of a larger functional group such as a carboxylic acid group.

"Non-thermoplastic" as used herein means, with respect to a material, such as a fibrous element as a whole and/or a polymer within a fibrous element, that the fibrous element and/or polymer exhibits no melting point and/or softening point, which allows it to flow under pressure, in the absence of a plasticizer, such as water, glycerin, sorbitol, urea and the like.

"Thermoplastic" as used herein means, with respect to a material, such as a fibrous element as a whole and/or a polymer within a fibrous element, that the fibrous element and/or polymer exhibits a melting point and/or softening point at a certain temperature, which allows it to flow under pressure.

"Non-cellulose-containing" as used herein means that less than 5% and/or less than 3% and/or less than 1% and/or less than 0.1% and/or 0% by weight of cellulose polymer, cellulose derivative polymer and/or cellulose copolymer is present in a fibrous element. In one example, "non-cellulose-containing" means that less than 5% and/or less than 3% and/or less than 1% and/or less than 0.1% and/or 0% by weight of cellulose polymer is present in a fibrous element.

"Fast wetting surfactant" as used herein means a surfactant that exhibits a Critical Micelle Concentration of greater 0.15% by weight and/or at least 0.25% and/or at least 0.50% and/or at least 0.75% and/or at least 1.0% and/or at least 1.25% and/or at least 1.4% and/or less than 10.0% and/or less than 7.0% and/or less than 4.0% and/or less than 3.0% and/or less than 2.0% by weight.

"Aqueous polymer melt composition" as used herein means a composition comprising water and a melt processed polymer, such as a melt processed fibrous element-forming polymer, for example a melt processed hydroxyl polymer.

"Melt processed fibrous element-forming polymer" as used herein means any polymer, which by influence of elevated temperatures, pressure and/or external plasticizers may be softened to such a degree that it can be brought into a flowable state, and in this condition may be shaped as desired. In one example, the melt processed fibrous element-forming polymer is a filament-forming polymer.

"Melt processed hydroxyl polymer" as used herein means any polymer that contains greater than 10% and/or greater than 20% and/or greater than 25% by weight hydroxyl groups and that has been melt processed, with or without the aid of an external plasticizer. More generally, melt processed hydroxyl polymers include polymers, which by the influence of elevated temperatures, pressure and/or external plasticizers may be softened to such a degree that they can be brought into a flowable state, and in this condition may be shaped as desired.

"Blend" as used herein means that two or more materials, such as a fibrous element-forming polymer, for example a hydroxyl polymer, and a non-hydroxyl polymer and/or a fast wetting surfactant are in contact with each other, such as mixed together homogeneously or non-homogeneously, within a polymeric structure, such as a fibrous element. In other words, a polymeric structure, such as a fibrous element, formed from one material, but having an exterior coating of another material is not a blend of materials for purposes of the present invention. However, a fibrous element formed from two different materials is a blend of materials for purposes of the present invention even if the fibrous element further comprises an exterior coating of a material.

"Associate," "Associated," "Association," and/or "Associating" as used herein with respect to fibrous elements means combining, either in direct contact or in indirect contact, fibrous elements such that a fibrous structure is formed. In one example, the associated fibrous elements may be bonded together for example by adhesives and/or thermal bonds. In another example, the fibrous elements may be associated with one another by being deposited onto the same fibrous structure making belt.

"Weight average molecular weight" as used herein means the weight average molecular weight as determined using gel permeation chromatography as generally described in Colloids and Surfaces A. Physico Chemical & Engineering Aspects, Vol. 162, 2000, pg. 107-121 and detailed in the Weight Average Molecular Weight Test Method described herein.

"Average Diameter" as used herein, with respect to a fibrous element, is measured according to the Average Diameter Test Method described herein. In one example, a fibrous element of the present invention exhibits an average diameter of less than 50 pin and/or less than 25 µm and/or less than 20 µm and/or less than 15 µm and/or less than 10 µm and/or less than 6 µm and/or greater than 1 µm and/or greater than 3 µm.

"Basis Weight" as used herein is the weight per unit area of a sample reported in $g/m^2$ as determined by the Basis Weight Test Method described herein.

"Machine Direction" or "MD" as used herein means the direction parallel to the flow of the fibrous structure through a fibrous structure making machine and/or sanitary tissue product manufacturing equipment. Typically, the MD is substantially perpendicular to any perforations present in the fibrous structure "Cross Machine Direction" or "CD" as used herein means the direction perpendicular to the machine direction in the same plane of the fibrous structure and/or sanitary tissue product comprising the fibrous structure.

"Ply" or "Plies" as used herein means an individual fibrous structure optionally to be disposed in a substantially contiguous, face-to-face relationship with other plies, forming a multiple ply fibrous structure. It is also contemplated that a single fibrous structure can effectively form two "plies" or multiple "plies", for example, by being folded on itself.

As used herein, the articles "a" and "an" when used herein, for example, "an anionic surfactant" or "a fiber" is understood to mean one or more of the material that is claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Fibrous Elements

The fibrous elements, for example filaments, of the present invention comprise a fibrous element-forming polymer, for example a filament-forming polymer, such as a hydroxyl polymer, and one or more hueing agents. In one example, the fibrous elements may comprise two or more fibrous element-forming polymers, such as two or more hydroxyl polymers. In another example, the fibrous elements of the present invention may comprise two or more non-hydroxyl polymers. In another example, the fibrous elements may comprise two or more non-hydroxyl polymers at least one of which exhibits a weight average molecular weight of greater than 1,400,000 g/mol and/or is present in the fibrous elements at a concentration greater than its entanglement concentration ($C_e$) and/or exhibits a polydispersity of greater than 1.32. In yet another example, the fibrous elements of the present invention may comprise two or more fibrous element-forming polymers, such as two or more hydroxyl polymers, at least one of which is starch and/or a starch derivative and one of which is a non-starch and/or non-starch derivative, such as polyvinyl alcohol. In still another example, the fibrous elements of the present invention may comprise two or more fibrous element-forming polymers at least one of which is a hydroxyl polymer and at least one of which is a non-hydroxyl polymer.

In one example, the fibrous element comprises a filament. In another example, the fibrous element comprises a fiber, such as a filament that has been cut into fibers.

In one example, the fibrous element, for example filament, comprises a compatabilizing agent, for example a compatibilizing agent is selected from the group consisting of: ethylene oxide, propylene oxide, butylene oxide, pentylene oxide, hexylene oxide, and mixtures thereof.

Hueing Agents

The aqueous polymer melt compositions and/or fibrous elements of the present invention may comprise one or more hueing agents. In one example, the total level of one or more hueing agents present within one or more, for example a plurality, of the fibrous elements of a fibrous structure of the present invention is such that the fibrous structure exhibits a Whiteness Index of greater than 72 and/or greater than 75 and/or greater than 77 and/or greater than 80 as measured according to the Whiteness Index Test Method described herein. In one example, the fibrous structure of the present invention comprising filaments comprising one or more hueing agents exhibits a Whiteness Index during use of the fibrous structure of greater than 72 and/or greater than 75 and/or greater than 77 and/or greater than 80 as measured according to the Whiteness Index Test Method described herein. To be clear, fibrous structures comprising filaments that comprise fabric hueing agents clearly do not exhibit a Whiteness Index during use of the fibrous structure of greater than 72 and/or greater than 75 and/or greater than 77 and/or greater than 80 as measured according to the Whiteness Index Test Method described herein because the fabric hueing agents are present at too high a level in the filaments and/or the filaments dissolve during use thereby releasing its fabric hueing agents.

In another example, the one or more hueing agents present within one or more, for example a plurality, of the fibrous elements of a fibrous structure of the present invention are such that the fibrous structure exhibits a Relative Hue Angle of from about 220° to about 330° and/or from about 250° to about 310° and/or from about 270° to about 300° as measured according to the Hue Angle Test Method described herein. In one example, the fibrous structure of the present invention comprising filaments comprising one or more hueing agents exhibits a Relative Hue Angle of from about 220° to about 330° and/or from about 250° to about 310° and/or from about 270° to about 300° as measured according to the Hue Angle Test Method described herein.

In still another example, the total level of one or more hueing agents present within one or more, for example a plurality, of the fibrous elements of a fibrous structure of the present invention is less than 1% and/or less than 0.5% and/or less than 0.05% and/or less than 0.005% and/or greater than 0.00001% and/or greater than 0.0001% and/or greater than 0.001% by weight of the dry fibrous element and/or dry fibrous structure formed by fibrous elements containing the hueing agents. In one example, the total level of one or more hueing agents present within one or more, for example a plurality, of the fibrous elements of a fibrous structure of the present invention is from about 0.0001% to about 0.5% and/or from about 0.0005% to about 0.05% and/or from about 0.001% to about 0.05% and/or from about 0.001% to about 0.005% by weight of the dry fibrous element and/or dry fibrous structure formed by fibrous elements containing the hueing agents.

Hueing agents can be used either alone or in combination. Hueing agents may be selected from any known chemical classes of dyes, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and mixtures thereof.

Non-limiting examples of hueing agents include dyes, dye-clay conjugates, and organic and inorganic pigments and mixtures thereof. Suitable dyes include small molecule dyes and polymeric dyes. Suitable small molecule dyes include small molecule dyes selected from the group consisting of dyes falling into the Colour Index (C.I.) classifications of Direct, Basic, Reactive or hydrolysed Reactive, Solvent or Disperse dyes for example that are classified as Blue, Violet, Red, Green or Black, and mixtures thereof. In another aspect, suitable small molecule dyes include small molecule dyes selected from the group consisting of Colour Index (Society of Dyers and Colourists, Bradford, UK) numbers Direct Violet dyes such as 9, 35, 48, 51, 66, and 99, Direct Blue dyes such as 1, 71, 80 and 279, Acid Red dyes such as 17, 73, 52, 88 and 150, Acid Violet dyes such as 15, 17, 24, 43, 49 and 50, Acid Blue dyes such as 15, 17, 25, 29, 40, 45, 75, 80, 83, 90 and 113, Acid Black dyes such as 1, Basic Violet dyes such as 1, 3, 4, 10 and 35, Basic Blue dyes such as 3, 16, 22, 47, 66, 75 and 159, Disperse or Solvent dyes such as those described in US 2008/034511 A1 or U.S. Pat. No. 8,268,016 B2, or dyes as disclosed in U.S. Pat. No. 7,208,459 B2, and mixtures thereof. In another aspect, suitable small molecule dyes include small molecule dyes selected from the group consisting of C.I. Acid Violet 17, Direct Blue 71, Direct Violet 51, Direct Blue 1, Acid Red 88, Acid Red 150, Acid Blue 29, Acid Blue 113 or mixtures thereof.

Suitable polymeric dyes include polymeric dyes selected from the group consisting of polymers containing covalently bound (sometimes referred to as conjugated) chromogens, (dye-polymer conjugates), for example polymers with chromogens co-polymerized into the backbone of the polymer and mixtures thereof. Polymeric dyes include those described in WO2011/98355, US 2012/225803 A1, US 2012/090102 A1, U.S. Pat. No. 7,686,892 B2, and WO2010/142503.

In one aspect, suitable polymeric dyes include polymeric dyes made from dyes that contain polymeric moieties via various polymerization methods that include but not limited to condensation, radical and ring opening polymerizations. Non-limiting examples include polymeric dyes produced via alkylation, alkoxylation, esterification, amidation and mixtures thereof.

In another aspect, suitable polymeric dyes include polymeric dyes selected from the group consisting of hueing agents commercially available under the trade name of Liquitint® (Milliken, Spartanburg, S.C., USA), dye-polymer conjugates formed from at least one reactive dye and a polymer selected from the group consisting of polymers comprising a moiety selected from the group consisting of a hydroxyl moiety, a primary amine moiety, a secondary amine moiety, a thiol moiety and mixtures thereof. In still another aspect, suitable polymeric dyes include polymeric dyes selected from the group consisting of Liquitint® Violet CT, carboxymethyl cellulose (CMC) covalently bound to a reactive blue, reactive violet or reactive red dye, or mixtures thereof such as CMC conjugated with C.I. Reactive Blue 19, sold by Megazyme, Wicklow, Ireland under the product name AZO-CM-CELLULOSE, product code S-ACMC, alkoxylated triphenyl-methane polymeric colourants, alkoxylated thiophene polymeric colourants, and mixtures thereof.

In one example, the polymeric dye is selected from the group consisting of: Violet CT, Violet DD, Violet V200, Liquitint Violet ION, Permalite Fast Violet B, carboxymethyl cellulose (CMC) conjugated with a reactive blue, reactive violet or reactive red dye such as CMC conjugated with C.I. Reactive Blue 19, alkoxylated polymeric colorants comprising substituted benzodifuranes, methines, triphenylmethanes, naphthalimides, pyrazoles, naphthoquinones, anthraquinones, thiophenes, thiazoliums, azos, and mixtures thereof.

Non-limiting examples of suitable hueing agents include the whitening agents found in WO 08/87497 A1, WO2011/011799 and US 2012129752 A1. In addition, other non-limiting examples of suitable hueing agents include dyes disclosed in these references, including those selected from Examples 1-42 in Table 5 of WO2011/011799. Other dyes disclosed in U.S. Pat. Nos. 8,138,222 and 7,090,890 B2 are also suitable hueing agents. Further examples of suitable whitening agents include whitening agents described in US2008034511 A1 (Unilever), for example "Solvent Violet 13." In practice any of the dyes found to be suitable for use as shading agents for whiteness benefits in laundering or rinse-added softening applications may be suitable for use in the instant invention.

Suitable dye clay conjugates include dye clay conjugates selected from the group comprising at least one cationic/basic dye and a smectite clay, and mixtures thereof. In another aspect, suitable dye clay conjugates include dye clay conjugates selected from the group consisting of one cationic/basic dye selected from the group consisting of C.I. Basic Yellow 1 through 108, C.I. Basic Orange 1 through 69, C.I. Basic Red 1 through 118, C.I. Basic Violet 1 through 51, C.I. Basic Blue 1 through 164, C.I. Basic Green 1 through 14, C.I. Basic Brown 1 through 23, CI Basic Black 1 through 11, and a clay selected from the group consisting of Montmorillonite clay, Hectorite clay, Saponite clay and mixtures thereof. In still another aspect, suitable dye clay conjugates include dye clay conjugates selected from the group consisting of: Montmorillonite Basic Blue B7 C.I. 42595 conjugate, Montmorillonite Basic Blue B9 C.I. 52015 conjugate, Montmorillonite Basic Violet V3 C.I. 42555 conjugate, Montmorillonite Basic Green G1 C.I. 42040 conjugate, Montmorillonite Basic Red R1 C.I. 45160 conjugate, Montmorillonite C.I. Basic Black 2 conjugate, Hectorite Basic Blue B7 C.I. 42595 conjugate, Hectorite Basic Blue B9 C.I. 52015 conjugate, Hectorite Basic Violet V3 C.I. 42555 conjugate, Hectorite Basic Green G1 C.I. 42040 conjugate, Hectorite Basic Red R1 C.I. 45160 conjugate, Hectorite C.I. Basic Black 2 conjugate, Saponite Basic Blue B7 C.I. 42595 conjugate, Saponite Basic Blue B9 C.I. 52015 conjugate, Saponite Basic Violet V3 C.I. 42555 conjugate, Saponite Basic Green G1 C.I. 42040 conjugate, Saponite Basic Red R1 C.I. 45160 conjugate, Saponite C.I. Basic Black 2 conjugate and mixtures thereof.

Suitable pigments include pigments selected from the group consisting of flavanthrone, indanthrone, chlorinated indanthrone containing from 1 to 4 chlorine atoms, pyranthrone, dichloropyranthrone, monobromodichloropyranthrone, dibromodichloropyranthrone, tetrabromopyranthrone, perylene-3,4,9,10-tetracarboxylic acid diimide, wherein the imide groups may be unsubstituted or substituted by C1-C3-alkyl or a phenyl or heterocyclic radical, and wherein the phenyl and heterocyclic radicals may additionally carry substituents which do not increase solubility of the pigments at 1 g of pigment in 100 g of deionized water at pH 7 at 25° C., anthrapyrimidinecarboxylic acid amides, violanthrone, isoviolanthrone, dioxazine pigments, copper phthalocyanine which may contain up to 2 chlorine atoms per molecule, polychloro-copper phthalocyanine or polybromochloro-copper phthalocyanine containing up to 14 bromine atoms per molecule and mixtures thereof.

In another example, suitable pigments include pigments selected from the group consisting of Ultramarine Blue (C.I. Pigment Blue 29), Ultramarine Violet (C.I. Pigment Violet 15) and mixtures thereof.

In one example, the hueing agent is a dye that exhibits an extinction coefficient of greater than 1000 L/mol/cm.

In another example, the hueing agent is a dye that exhibits a peak absorbance maximum ($\lambda$ Max) of from about 400 to about 700 nm and/or from about 500 to about 650 nm and/or from about 550 to about 650 nm and/or from about 570 to about 630 nm as measured according to the $\lambda$ Max Test Method described herein.

In one example, the hueing agents within a fibrous element of the present invention may comprise a mixture of dyes, a mixture of pigments, and/or a mixture of dyes and pigments.

In another example, the fibrous structure of the present invention may comprise one or more first filaments comprising a first hueing agent and one or more second filaments comprising a second hueing agent different from the first hueing agent. In one example, the fibrous structure of the present invention comprises at least one filament that comprises at least one different hueing agent from the other filaments within the fibrous structure.

In another example, a multi-ply sanitary tissue product comprises two or more fibrous structures (plies) of the present invention wherein the fibrous elements, for example filaments, of the two or more fibrous structures comprise different (filament) hueing agents (in other words, a filament in one fibrous structure (ply) comprises a different hueing agent from a filament in the other fibrous structure (ply)).

In another example, a multi-ply sanitary tissue product comprises two or more fibrous structures (plies) of the present invention wherein at least one of the fibrous structures exhibits an Absolute Hue Angle different by at least 5 degrees from a different (another) fibrous structure within the multi-ply sanitary tissue product as measured by the Hue Angle Test Method described herein.

Fibrous Element-Forming Polymers

The aqueous polymer melt compositions of the present invention and/or polymer structures, for example fibrous elements, such as filaments and/or fibers, of the present invention that associate to form fibrous structures of the present invention contain at least one fibrous element-forming polymer, such as a hydroxyl polymer, and may contain other types of polymers such as non-hydroxyl polymers that exhibit weight average molecular weights of greater than 500,000 g/mol, and mixtures thereof as determined by the Weight Average Molecular Weight Test Method described herein.

Non-limiting examples of hydroxyl polymers in accordance with the present invention include polyols, such as polyvinyl alcohol, polyvinyl alcohol derivatives, polyvinyl alcohol copolymers, starch, starch derivatives, starch copolymers, chitosan, chitosan derivatives, chitosan copolymers, cellulose, cellulose derivatives such as cellulose ether and ester derivatives, cellulose copolymers, hemicellulose, hemicellulose derivatives, hemicellulose copolymers, gums, arabinans, galactans, proteins and various other polysaccharides and mixtures thereof.

In one example, a hydroxyl polymer of the present invention comprises a polysaccharide.

In another example, a hydroxyl polymer of the present invention comprises a non-thermoplastic polymer.

The hydroxyl polymer may have a weight average molecular weight of from about 10,000 g/mol to about 40,000,000 g/mol and/or greater than 100,000 g/mol and/or greater than 1,000,000 g/mol and/or greater than 3,000,000 g/mol and/or greater than 3,000,000 g/mol to about 40,000,000 g/mol as determined by the Weight Average Molecular Weight Test Method described herein. Higher and lower molecular weight hydroxyl polymers may be used in combination with hydroxyl polymers having a certain desired weight average molecular weight.

Well known modifications of hydroxyl polymers, such as natural starches, include chemical modifications and/or enzymatic modifications. For example, natural starch can be acid-thinned, hydroxy-ethylated, hydroxy-propylated, and/or oxidized. In addition, the hydroxyl polymer may comprise dent corn starch.

Polyvinyl alcohols herein can be grafted with other monomers to modify its properties. A wide range of monomers has been successfully grafted to polyvinyl alcohol. Non-limiting examples of such monomers include vinyl acetate, styrene, acrylamide, acrylic acid, 2-hydroxyethyl methacrylate, acrylonitrile, 1,3-butadiene, methyl methacrylate, methacrylic acid, vinylidene chloride, vinyl chloride, vinyl amine and a variety of acrylate esters. Polyvinyl alcohols comprise the various hydrolysis products formed from polyvinyl acetate.

In one example the level of hydrolysis of the polyvinyl alcohols is greater than 70% and/or greater than 88% and/or greater than 95% and/or about 99%.

"Polysaccharides" as used herein means natural polysaccharides and polysaccharide derivatives and/or modified polysaccharides. Suitable polysaccharides include, but are not limited to, starches, starch derivatives, starch copolymers, chitosan, chitosan derivatives, chitosan copolymers, cellulose, cellulose derivatives, cellulose copolymers, hemicellulose, hemicellulose derivatives, hemicelluloses copolymers, gums, arabinans, galactans, and mixtures thereof. The polysaccharide may exhibit a weight average molecular weight of from about 10,000 to about 40,000,000 g/mol and/or greater than about 100,000 and/or greater than about 1,000,000 and/or greater than about 3,000,000 and/or greater than about 3,000,000 to about 40,000,000 as determined by the Weight Average Molecular Weight Test Method described herein.

The polysaccharides of the present invention may comprise non-cellulose and/or non-cellulose derivatives and/or non-cellulose copolymer hydroxyl polymers. Non-limiting example of such non-cellulose polysaccharides may be selected from the group consisting of: starches, starch derivatives, starch copolymers, chitosan, chitosan derivatives, chitosan copolymers, hemicellulose, hemicellulose derivatives, hemicelluloses copolymers, and mixtures thereof.

In one example, the hydroxyl polymer comprises starch, a starch derivative and/or a starch copolymer. In another example, the hydroxyl polymer comprises starch and/or a starch derivative. In yet another example, the hydroxyl polymer comprises starch. In one example, the hydroxyl polymer comprises ethoxylated starch. In another example, the hydroxyl polymer comprises acid-thinned starch.

As is known, a natural starch can be modified chemically or enzymatically, as well known in the art. For example, the natural starch can be acid-thinned, hydroxy-ethylated, hydroxy-propylated, ethersuccinylated or oxidized. In one example, the starch comprises a high amylopectin natural starch (a starch that contains greater than 75% and/or greater than 90% and/or greater than 98% and/or about 99% amylopectin). Such high amylopectin natural starches may be derived from agricultural sources, which offer the advantages of being abundant in supply, easily replenishable and relatively inexpensive. Chemical modifications of starch typically include acid or alkaline-catalyzed hydrolysis and chain scission (oxidative and/or enzymatic) to reduce molecular weight and molecular weight distribution. Suitable compounds for chemical modification of starch include organic acids such as citric acid, acetic acid, glycolic acid, and adipic acid; inorganic acids such as hydrochloric acid, sulfuric acid, nitric acid, phosphoric acid, boric acid, and partial salts of polybasic acids, e.g., $KH_2PO_4$, $NaHSO_4$; group Ia or IIa metal hydroxides such as sodium hydroxide, and potassium hydroxide; ammonia; oxidizing agents such as hydrogen peroxide, benzoyl peroxide, ammonium persulfate, potassium permanganate, hypochloric salts, and the like; and mixtures thereof.

"Modified starch" is a starch that has been modified chemically or enzymatically. The modified starch is contrasted with a native starch, which is a starch that has not been modified, chemically or otherwise, in any way.

Chemical modifications may also include derivatization of starch by reaction of its hydroxyl groups with alkylene oxides, and other ether-, ester-, urethane-, carbamate-, or isocyanate-forming substances. Hydroxyalkyl, ethersuccinylated, acetyl, or carbamate starches or mixtures thereof can be used as chemically modified starches. The degree of substitution of the chemically modified starch is from 0.001 to 3.0, and more specifically from 0.003 to 0.2. Biological modifications of starch may include bacterial digestion of the carbohydrate bonds, or enzymatic hydrolysis using enzymes such as amylase, amylopectase, and the like.

Generally, all kinds of natural starches can be used in the present invention. Suitable naturally occurring starches can include, but are not limited to: corn starch, potato starch, sweet potato starch, wheat starch, sago palm starch, tapioca starch, rice starch, soybean starch, arrow root starch, amioca starch, bracken starch, lotus starch, waxy maize starch, and high amylose corn starch. Naturally occurring starches, particularly corn starch and wheat starch, can be particularly beneficial due to their low cost and availability.

In one example, to generate rheological properties suitable for high-speed fibrous element spinning processes, the molecular weight of the natural, unmodified starch may be reduced. The optimum molecular weight is dependent on the type of starch used. For example, a starch with a low level of amylose component, such as a waxy maize starch, disperses rather easily in an aqueous solution with the application of heat and does not retrograde or recrystallize significantly. With these properties, a waxy maize starch can be used at a weight average molecular weight, for example in the range of 500,000 g/mol to 40,000,000 g/mol as determined by the Weight Average Molecular Weight Test Method described herein. Modified starches such as hydroxy-ethylated Dent corn starch, which contains about 25% amylose, or oxidized Dent corn starch tend to retrograde more than waxy maize starch but less than acid thinned starch. This retrogradation, or recrystallization, acts as a physical cross-linking to effectively raise the weight average molecular weight of the starch in aqueous solution. Therefore, an appropriate weight average molecular weight for a typical commercially available hydroxyethylated Dent corn starch with 2 wt. % hydroxyethylation or oxidized Dent corn starch is from about 200,000 g/mol to about 10,000,000 g/mol. For ethoxylated starches with higher degrees of ethoxylation, for example a hydroxyethylated Dent corn starch with 5 wt % hydroxyethylation, weight average molecular weights of up to 40,000,000 g/mol as determined by the Weight Average Molecular Weight Test Method described herein may be suitable for the present invention. For acid thinned Dent corn starch, which tends to retrograde more than oxidized Dent corn starch, the appropriate weight average molecular weight is from about 100,000 g/mol to about 15,000,000 g/mol as determined by the Weight Average Molecular Weight Test Method described herein.

The weight average molecular weight of starch may also be reduced to a desirable range for the present invention by physical/mechanical degradation (e.g., via the thermomechanical energy input of the processing equipment).

The natural starch can be hydrolyzed in the presence of an acid catalyst to reduce the molecular weight and molecular weight distribution of the composition. The acid catalyst can be selected from the group consisting of hydrochloric acid, sulfuric acid, phosphoric acid, citric acid, ammonium chloride and any combination thereof. Also, a chain scission agent may be incorporated into a spinnable starch composition such that the chain scission reaction takes place substantially concurrently with the blending of the starch with other components. Non-limiting examples of oxidative chain scission agents suitable for use herein include ammonium persulfate, hydrogen peroxide, hypochlorite salts, potassium permanganate, and mixtures thereof. Typically, the chain scission agent is added in an amount effective to reduce the weight average molecular weight of the starch to the desirable range. It is found that compositions having modified starches in the suitable weight average molecular weight ranges have suitable shear viscosities, and thus improve processability of the composition. The improved processability is evident in less interruptions of the process (e.g., reduced breakage, shots, defects, hang-ups) and better surface appearance and strength properties of the final product, such as fibers of the present invention.

In one example, the fibrous element of the present invention is void of thermoplastic, water-insoluble polymers.

Crosslinking System

A crosslinking system comprising a crosslinking agent capable of crosslinking a fibrous element-forming polymer, for example a hydroxyl polymer, and a crosslinking facilitator are present in the aqueous polymer melt composition of the present invention. The crosslinking results in a crosslinked polysaccharide.

In one example, the fibrous element of the present invention is a crosslinked fibrous element.

The crosslinking agent and/or crosslinking facilitator may be added to the aqueous polymer melt composition, for example before polymer processing of the aqueous polymer melt composition. The crosslinking agent and/or crosslinking facilitator are present in the fibrous elements produced from the aqueous polymer melt compositions of the present invention.

Upon crosslinking the hydroxyl polymer during the curing step, the crosslinking agent becomes an integral part of the filament as a result of crosslinking the hydroxyl polymer as shown in the following schematic representation:

Hydroxyl polymer—Crosslinking agent—Hydroxyl polymer

"Crosslinking facilitator" as used herein means any material that is capable of activating a crosslinking agent thereby transforming the crosslinking agent from its unactivated state to its activated state. In other words, when a crosslinking agent is in its unactivated state, the hydroxyl polymer present in the aqueous polymer melt composition does not undergo unacceptable crosslinking. Unacceptable crosslinking causes the shear viscosity and n value to fall outside the ranges specified which are determined according to the Shear Viscosity of a Polymer Melt Composition Measurement Test Method. In the case of imidazolidinone crosslinkers, the pH and the temperature of the aqueous polymer melt composition should be in the desired ranges, from pH of from about 2 to about 11 and/or from about 2.5 to about 9 and/or from about 3 to about 8.5 and/or from about 3.2 to about 8 and/or from about 3.2 to about 7.5 as measured by the Polymer Melt Composition pH Test Method described herein; unacceptable crosslinking occurs outside these ranges.

In one example, the filaments and/or aqueous polymer melt composition of the present invention comprise one or more crosslinking facilitators.

For example, a crosslinking facilitator salt being chemically changed to its acid form and vice versa.

Non-limiting examples of suitable crosslinking facilitators of the present invention include ammonium salts of methanesulfonic acid, ethanesulfonic acid, propanesulfonic acid, isopropylsulfonic acid, butanesulfonic acid, isobutylsulfonic acid, sec-butylsulfonic acids.

The ammonium alkylsulfonate salt of the present invention may have the following formula (I):

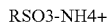

where R is a C1-C18 alkyl and/or a C1-C12 alkyl and/or a C1-C8 alkyl group.

Non-limiting examples of suitable alkyl groups are selected from the group consisting of: methyl, ethyl, propyl, butyl, octyl, decyl, and dodecyl.

In one example, the crosslinking facilitator of the present invention may comprise one or more ammonium alkylsulfonate salts and/or derivatives of the alkylsulfonate salts that may exist after the transformation/activation of the crosslinking agent. In one example, the crosslinking facilitator may comprise an ammonium salt of trifluoromethanesulfonic acid.

In addition, metal salts, such as magnesium and zinc salts, can be used in combination with the ammonium alkylsulfonate salts and/or acids thereof, as additional crosslinking facilitators.

The crosslinking facilitator may include derivatives of the material that may exist after the transformation/activation of the crosslinking agent. For example, a crosslinking facilitator salt being chemically changed to its acid form and vice versa.

Non-limiting examples of additional suitable crosslinking facilitators include acids having a pKa of between 2 and 6 or salts thereof. The crosslinking facilitators may be Brønsted Acids and/or salts thereof, such as ammonium salts thereof.

In addition, metal salts, such as magnesium and zinc salts, can be used alone or in combination with Brønsted Acids and/or salts thereof, as crosslinking facilitators.

Non-limiting examples of such suitable crosslinking facilitators include benzoic acid, citric acid, formic acid, glycolic acid, lactic acid, maleic acid, phthalic acid, phosphoric acid, hypophosphoric acid, succinic acid, and mixtures thereof and/or their salts, such as their ammonium salts, such as ammonium glycolate, ammonium citrate, ammonium chloride, ammonium sulfate Additional non-limiting examples of suitable crosslinking facilitators include glyoxal bisulfite salts, primary amine salts, such as hydroxyethyl ammonium salts, hydroxypropyl ammonium salt, secondary amine salts, ammonium toluene sulfonate, ammonium benzene sulfonate, ammonium xylene sulfonate, magnesium chloride, and zinc chloride.

The crosslinking facilitator may be present in the filament at a level of from about 0.1% to 5% and/or from about 0.15% to about 4% and/or from about 0.2% to about 2% by weight of the filament.

In one example, the crosslinking facilitators, filaments, and aqueous polymer melt compositions are void or essentially void (less than 0.025% by weight) of kosmotropic salts, such as ammonium sulfate and ammonium citrate. The inclusion 0.025% and greater of a kosmotropic salt, such as ammonium sulfate, even when an ammonium alkysulfonate salt and/or acid is present, may negatively impact the properties, such as strength (for example TEA), of the filaments. However, the inclusion of an amount of an ammonium salt, such as ammonium chloride, for example an amount that does not produce negative corrosive effects in the processing and spinning equipment, in combination with an ammonium alkylsulfonate salt may be desired.

Other Polymers

The aqueous polymer melt compositions of the present invention and/or fibrous elements of the present invention may comprise, in addition to the fibrous element-forming polymer, other polymers, such as non-hydroxyl polymers.

Non-limiting examples of suitable non-hydroxyl polymers that may be included in the fibrous elements of the present invention include non-hydroxyl polymers that exhibit a weight average molecular weight of greater than 500,000 g/mol and/or greater than 750,000 g/mol and/or greater than 1,000,000 g/mol and/or greater than 1,250,000 g/mol and/or at greater than 1,400,000 g/mol and/or at least 1,450,000 g/mol and/or at least 1,500,000 g/mol and/or less than 10,000,000 g/mol and/or less than 5,000,000 g/mol and/or less than 2,500,00 g/mol and/or less than 2,000,000 g/mol and/or less than 1,750,000 g/mol as determined by the Weight Average Molecular Weight Test Method described herein.

In one example, the non-hydroxyl polymer exhibits a polydispersity of greater than 1.10 and/or at least 1.20 and/or at least 1.30 and/or at least 1.32 and/or at least 1.40 and/or at least 1.45.

In another example, the non-hydroxyl polymer exhibits a concentration greater than its entanglement concentration (Ce) and/or a concentration greater than 1.2 times its entanglement concentration (Ce) and/or a concentration greater than 1.5 times its entanglement concentration (Ce) and/or a concentration greater than twice its entanglement concentration (Ce) and/or a concentration greater than 3 times its entanglement concentration (Ce).

Non-limiting examples of suitable non-hydroxyl polymers include polyacrylamide and derivatives such as carboxyl modified polyacrylamide polymers and copolymers including polyacrylic, poly(hydroxyethyl acrylic), polymethacrylic acid and their partial esters; vinyl polymers including polyvinylalcohol, polyvinylpyrrolidone, and the like; polyamides; polyalkylene oxides such as polyethylene oxide and mixtures thereof. Copolymers or graft copolymers made from mixtures of monomers selected from the aforementioned polymers are also suitable herein. Non-limiting examples of commercially available polyacrylamides include nonionic polyacrylamides such as N300 from Kemira or Hyperfloc® NF221, NF301, and NF241 from Hychem, Inc.

Typically, the non-hydroxyl polymers are present in an amount of from about 0.01% to about 10% and/or from about 0.05% to about 5% and/or from about 0.075% to about 2.5% and/or from about 0.1% to about 1%, by weight of the aqueous polymer melt composition, polymeric structure, fibrous element and/or fibrous structure.

In yet another example, the non-hydroxyl polymer comprises a linear polymer. In another example, the non-hydroxyl polymer comprises a long chain branched polymer. In still another example, the non-hydroxyl polymer is compatible with the hydroxyl polymer at a concentration greater than the non-hydroxyl polymer's entanglement concentration $C_e$.

Non-limiting examples of suitable non-hydroxyl polymers are selected from the group consisting of: polyacrylamide and its derivatives; polyacrylic acid, polymethacrylic acid and their esters; polyethyleneimine; copolymers made from mixtures of the aforementioned polymers; and mixtures thereof. In one example, the non-hydroxyl polymer comprises polyacrylamide. In one example, the fibrous elements comprise two or more non-hydroxyl polymers, such as two or more polyacrylamides, such at two or more different weight average molecular weight polyacrylamides.

Fast Wetting Surfactants

Any suitable fast wetting surfactant may be used in the present invention. Non-limiting examples of suitable fast wetting surfactants include surfactants that exhibit a twin-tailed general structure, for example a surfactant that exhibits a structure IIA or IIB as follows.

Structure IIA

Structure IIB wherein R is independently selected from substituted or unsubstituted, linear or branched aliphatic groups and mixtures thereof. In one example, R is independently selected from substituted or unsubstituted, linear or branched $C_4$-$C_7$ aliphatic chains and mixtures thereof. In another example, R is independently selected from substituted or unsubstituted, linear or branched $C_4$-$C_7$ alkyls and mixtures thereof. In another example, R is independently selected from substituted or unsubstituted, linear or branched $C_5$-$C_6$ alkyls and mixtures thereof. In still another example, R is independently selected from substituted or unsubstituted, linear or branched $C_6$ alkyls and mixtures thereof. In even another example, R is an unsubstituted, branched $C_6$ alkyl having the following structure III.

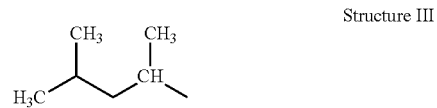

Structure III

In another example, R is independently selected from substituted or unsubstituted, linear or branched $C_5$ alkyls and mixtures thereof. In yet another example, R is independently selected from unsubstituted, linear $C_5$ alkyls and mixtures thereof. The $C_5$ alkyl may comprise a mixture of unsubstituted linear $C_5$ alkyls, for example $C_5$ n-pentyl, and/or 1-methyl branched $C_5$ alkyls as shown in the following structure IV.

Structure IV

In even another example, R comprises a mixture of $C_4$-$C_7$ alkyls and/or a mixture of $C_5$-$C_6$ alkyls.

The fast wetting surfactants may be present in the polymer melt compositions, fibrous elements, and/or fibrous structures of the present invention, alone or in combination with other non-fast wetting surfactants.

In one example, the fast wetting surfactants of the present invention may be used individually or in mixtures with each other or in a mixture with one or more non-fast wetting surfactants, for example a $C_8$ sulfosuccinate surfactant where R is the following structure V Structure V

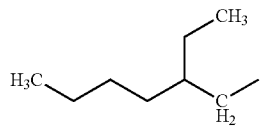

In one example a fast wetting surfactant comprises a sulfosuccinate surfactant having the following structure VI.

Structure VI

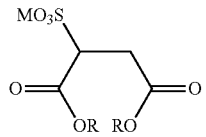

wherein R is independently selected from substituted or unsubstituted, linear or branched aliphatic groups and mixtures thereof. In one example, R is independently selected from substituted or unsubstituted, linear or branched $C_4$-$C_7$ aliphatic chains and mixtures thereof. In another example, R is independently selected from substituted or unsubstituted, linear or branched $C_4$-$C_7$ alkyls and mixtures thereof. In another example, R is independently selected from substituted or unsubstituted, linear or branched $C_5$-$C_6$ alkyls and mixtures thereof. In still another example, R is independently selected from substituted or unsubstituted, linear or branched $C_6$ alkyls and mixtures thereof. In even another example, R is an unsubstituted, branched $C_6$ alkyl having the following structure III.

Structure III

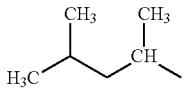

Non-limiting examples of fast wetting surfactants according to the present invention include sulfosuccinate surfactants, for example a sulfosuccinate surfactant that has structure III as its R groups (Aerosol® MA-80), a sulfosuccinate surfactant that has $C_4$ isobutyl as its R groups (Aerosol® IB), and a sulfosuccinate surfactant that has a mixture of $C_5$ n-pentyl and structure IV as its R groups (Aerosol® AY), all commercially available from Cytec.

Additional non-limiting examples of fast wetting surfactants according to the present invention include alcohol sulfates derived from branched alcohols such as Isalchem and Lial alcohols (from Sasol) ie. Dacpon 27 23 AS and Guerbet alcohols from Lucky Chemical. Still another example of a fast wetting surfactant includes paraffin sulfonates such as Hostapur SAS30 from Clariant.

Typically, the fast wetting surfactants are present in an amount of from about 0.01% to about 5% and/or from about 0.5% to about 2.5% and/or from about 1% to about 2% and/or from about 1% to about 1.5%, by weight of the aqueous polymer melt composition, polymeric structure, fibrous element and/or fibrous structure.

In one example, the fast wetting surfactants of the present invention exhibit a Minimum Surface Tension in Distilled Water of less than 34.0 and/or less than 33.0 and/or less than 32.0 and/or less than 31.0 and/or less than 30.0 and/or less than 29.0 and/or less than 28.0 and/or less than 27.0 and/or less than 26.75 and/or less than 26.5 and/or less than 26.2 and/or less than 25.0 mN/m and/or to greater than 0 and/or greater than 1.0 mN/m.

In still another example, the fast wetting surfactants of the present invention exhibit a CMC of greater than 0.15% and/or at least 0.25% and/or at least 0.50% and/or at least 0.75% and/or at least 1.0% and/or at least 1.25% and/or at least 1.4% and/or less than 10.0% and/or less than 7.0% and/or less than 4.0% and/or less than 3.0% and/or less than 2.0% by weight and a Minimum Surface Tension in Distilled Water of less than 34.0 and/or less than 33.0 and/or less than 32.0 and/or less than 31.0 and/or less than 30.0 and/or less than 29.0 and/or less than 28.0 and/or less than 27.0 and/or less than 26.75 and/or less than 26.5 and/or less than 26.2 and/or less than 25.0 mN/m and/or to greater than 0 and/or greater than 1.0 mN/m. In even another example, the fast wetting surfactants of the present invention exhibit a CMC of at least 1.0% and/or at least 1.25% and/or at least 1.4% and/or less than 4.0% and/or less than 3.0% and/or less than 2.0% by weight and a Minimum Surface Tension in Distilled Water of less than 34.0 and/or less than 33.0 and/or less than 32.0 and/or less than 31.0 and/or less than 30.0 and/or less than 29.0 and/or less than 28.0 and/or less than 27.0 and/or less than 26.75 and/or less than 26.5 and/or less than 26.2 and/or less than 25.0 mN/m and/or to greater than 0 and/or greater than 1.0 mN/m. CMC and Minimum Surface Tension in Distilled Water values of surfactants can be measured by any suitable methods known in the art, for example those methods described in Principles of Colloid and Surface Chemistry, p 370-375, incorporated herein by reference.

It is also possible to use ammonium salts of the fast wetting surfactants with structure IIA above where M=$^+NH_4$, ethanolammonium, hydroxypropylammonium, N,N"-dimethylethanolammonium, 2-ammonium-2-methylpropanol as the crosslinking facilitator of the present invention. Similarly, the ammonium salts of structure V where M=the aforementioned ammonium species are also acceptable as crosslinking facilitators of the present invention. The aforementioned ammonium salts of structure V where R=methyl, ethyl, and propyl are also acceptable as crosslinking facilitators of the present invention. The aforementioned ammonium salts of alpha-olefin sulfonates and paraffin sulfonates produced via sulfochlorination or sulfoxidation are also acceptable as crosslinking facilitators of the present invention.

Solid Additives

The polymeric structures, for example fibrous structures and/or sanitary tissue products of the present invention may further comprise one or more solid additives. "Solid additive" as used herein means an additive that is capable of being applied to a surface of a fibrous structure in a solid form. In other words, the solid additive of the present invention can be delivered directly to a surface of a nonwoven substrate without a liquid phase being present, i.e. without melting the solid additive and without suspending the solid additive in a liquid vehicle or carrier. As such, the solid additive of the present invention does not require a liquid state or a liquid vehicle or carrier in order to be delivered to a surface of a nonwoven substrate. The solid additive of the present invention may be delivered via a gas or combinations of gases. In one example, in simplistic terms, a solid additive is an additive that when placed within a container, does not take the shape of the container.

Non-limiting examples of suitable solid additives include hydrophilic inorganic particles, hydrophilic organic particles, hydrophobic inorganic particles, hydrophobic organic particles, naturally occurring fibers, non-naturally occurring particles and non-naturally occurring fibers.

In one example, the naturally occurring fibers may comprise wood pulp fibers, trichomes, seed hairs, protein fibers, such as silk and/or wool, and/or cotton linters. In one example the solid additive comprises chemically treated pulp fibers. Non-limiting examples of chemically treated pulp fibers are commercially available from Georgia-Pacific Corporation In another example, the non-naturally occurring fibers may comprise polyolefin fibers, such as polypropylene fibers, and/or polyamide fibers.

In another example, the hydrophilic inorganic particles are selected from the group consisting of: clay, calcium carbonate, titanium dioxide, talc, aluminum silicate, calcium silicate, alumina trihydrate, activated carbon, calcium sulfate, glass microspheres, diatomaceous earth and mixtures thereof.

In one example, hydrophilic organic particles of the present invention may include hydrophobic particles the surfaces of which have been treated by a hydrophilic material. Non-limiting examples of such hydrophilic organic particles include polyesters, such as polyethylene terephthalate particles that have been surface treated with a soil release polymer and/or surfactant. Another example is a polyolefin particle that has been surface treated with a surfactant.

In another example, the hydrophilic organic particles may comprise superabsorbent particles and/or superabsorbent materials such as hydrogels, hydrocolloidal materials and mixtures thereof. In one example, the hydrophilic organic particle comprises polyacrylate. Other Non-limiting examples of suitable hydrophilic organic particles are known in the art.

In another example, the hydrophilic organic particles may comprise high molecular weight starch particles (high amylose-containing starch particles), such as Hylon 7 available from National Starch and Chemical Company.

In another example, the hydrophilic organic particles may comprise cellulose particles.

In another example, the hydrophilic organic particles may comprise compressed cellulose sponge particles.

In one example of a solid additive in accordance with the present invention, the solid additive exhibits a surface tension of greater then about 30 and/or greater than about 35 and/or greater than about 40 and/or greater than about 50 and/or greater than about 60 dynes/cm as determined by ASTM D2578.

The solid additives of the present invention may have different geometries and/or cross-sectional areas that include round, elliptical, star-shaped, rectangular, trilobal and other various eccentricities.

In one example, the solid additive may exhibit a particle size of less than 6 mm and/or less than 5.5 mm and/or less than 5 mm and/or less than 4.5 mm and/or less than 4 mm and/or less than 2 mm in its maximum dimension.

"Particle" as used herein means an object having an aspect ratio of less than about 25/1 and/or less than about 15/1 and/or less than about 10/1 and/or less than 5/1 to about 1/1. A particle is not a fiber as defined herein.

The solid additives may be present in the fibrous structures of the present invention at a level of greater than about 1 and/or greater than about 2 and/or greater than about 4 and/or to about 20 and/or to about 15 and/or to about 10 $g/m^2$. In one example, a fibrous structure of the present invention comprises from about 2 to about 10 and/or from about 5 to about 10 $g/m^2$ of solid additive.

In one example, the solid additives are present in the fibrous structures of the present invention at a level of greater than 5% and/or greater than 10% and/or greater than 20% to about 50% and/or to about 40% and/or to about 30%.

Scrim Material

The fibrous structure and/or sanitary tissue product may further comprise a scrim material. The scrim material may comprise any suitable material capable of bonding to the nonwoven substrate of the present invention. In one example, the scrim material comprises a material that can be thermally bonded to the nonwoven substrate of the present invention. Non-limiting examples of suitable scrim materials include filaments of the present invention. In one example, the scrim material comprises filaments that comprise hydroxyl polymers. In another example, the scrim material comprises starch filaments. In yet another example, the scrim material comprises filaments comprising a thermoplastic polymer. In still another example, the scrim material comprises a fibrous structure according to the present invention wherein the fibrous structure comprises filaments comprising hydroxyl polymers, such as starch filaments, and/or thermoplastic polymers. In another example, the scrim material may comprise a film. In another example, the scrim material may comprise a nonwoven substrate according to the present invention. In even another example, the scrim material may comprise a latex.

In one example, the scrim material may be the same composition as the nonwoven substrate.

The scrim material may be present in the fibrous structures of the present invention at a basis weight of greater than 0.1 and/or greater than 0.3 and/or greater than 0.5 and/or greater than 1 and/or greater than 2 $g/m^2$ and/or less than 10 and/or less than 7 and/or less than 5 and/or less than 4 $g/m^2$ as determined by the Basis Weight Test Method described herein.

Methods of the Present Invention

The methods of the present invention relate to producing filaments from aqueous polymer melt compositions comprising a fibrous element-forming polymer, such as a hydroxyl polymer, a crosslinking agent, such as dihydroxyethyleneurea (DHEU), and a crosslinking facilitator, such as an ammonium alkylsulfonate salt.

Methods for Making Fibrous Structure

Figure 2:
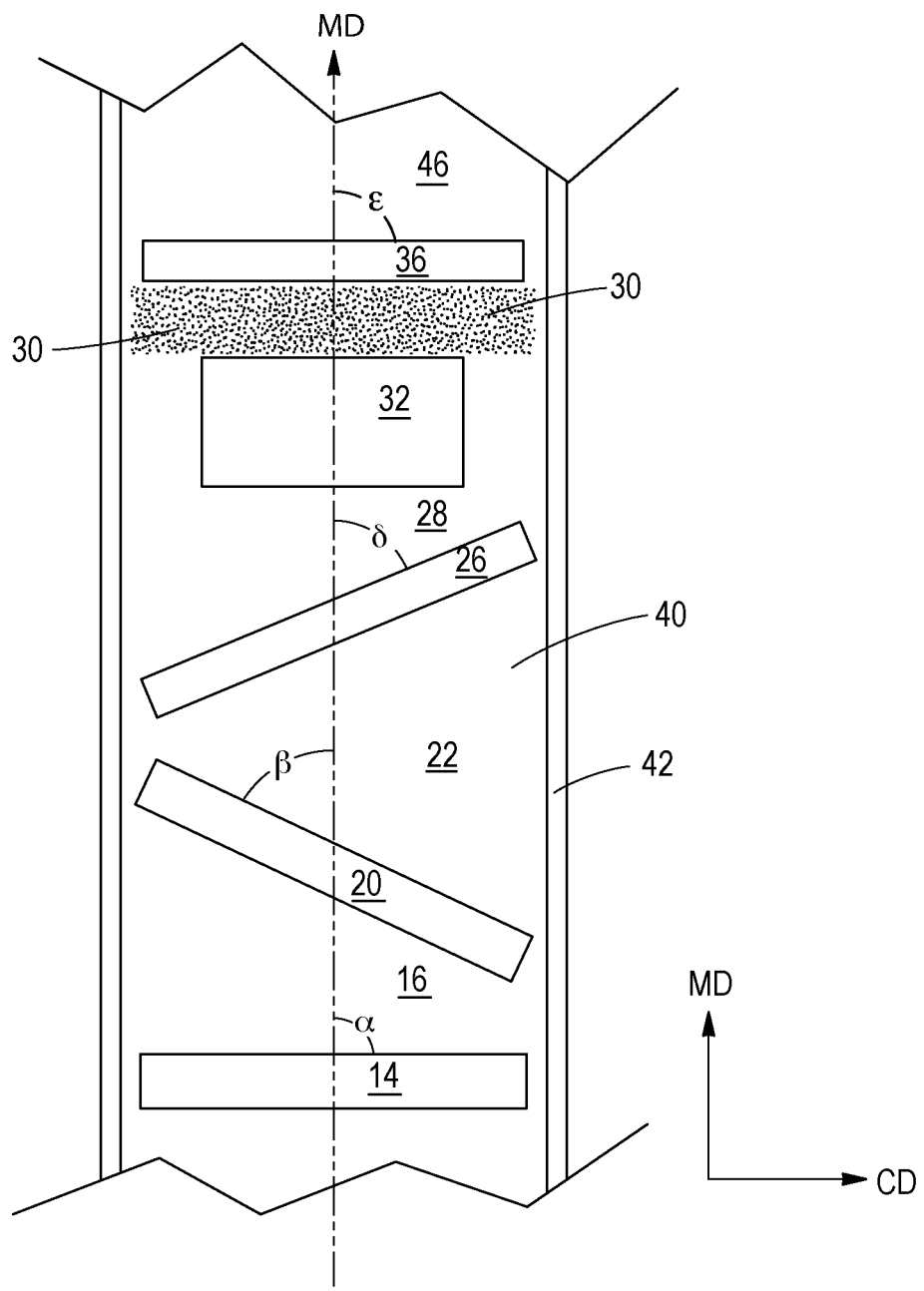
FIG. 2 is a schematic representation of one example of a portion of fibrous structure making process according to the present invention.

FIGS. 1 and 2 illustrate one example of a method for making a fibrous structure of the present invention. As shown in FIGS. 1 and 2, the method 10 comprises the steps of:

a. providing first filaments 12 from a first source 14 of filaments, which form a first layer 16 of filaments;

b. providing second filaments 18 from a second source 20 of filaments, which form a second layer 22 of filaments;

c. providing third filaments 24 from a third source 26 of filaments, which form a third layer 28 of filaments;

d. providing solid additives 30 from a source 32 of solid additives;

e. providing fourth filaments 34 from a fourth source 36 of filaments, which form a fourth layer 38 of filaments; and f. collecting the first, second, third, and fourth filaments 12, 18, 24, 34 and the solid additives 30 to form a fibrous structure 40, wherein the first source 14 of filaments is oriented at a first angle α to the machine direction of the fibrous structure 40, the second source 20 of filaments is oriented at a second angle β to the machine direction different from the first angle α, the third source 26 is oriented at a third angle δ to the machine direction different from the first angle α and the second angle β, and wherein the fourth source 36 is oriented at a fourth angle ε to the machine direction different from the second angle β and third angle δ.

The first, second, and third layers 16, 22, 28 of filaments are collected on a collection device 42, which may be a belt or fabric. The collection device 42 may be a patterned belt that imparts a pattern, such as a non-random, repeating pattern to the fibrous structure 40 during the fibrous structure making process. The first, second, and third layers 16, 22, 28 of filaments are collected (for example one on top of the other) on the collection device 42 to form a multi-layer nonwoven substrate 44 upon which the solid additives 30 are deposited. The fourth layer 38 of filaments may then be deposited onto the solid additives 30 to form a scrim 46.

The first angle α and the fourth angle ε may be the same angle, for example 90° to the machine direction.

The second angle β and the third angle δ may be the same angle, just positive and negative of one another. For example the second angle β may be −40° to the machine direction and the third angle δ may be +40° to the machine direction.

In one example, at least one of the first, second, and third angles α, β, δ is less than 90° to the machine direction. In another example, the first angle α and/or fourth angle ε is about 90° to the machine direction. In still another example, the second angle β and/or third angle δ is from about ±10° to about ±80° and/or from about ±30° to about ±60° to the machine direction and/or about ±40° to the machine direction.

In one example, the first, second, and third layers 16, 22, 28 of filaments may be formed into a nonwoven substrate 44 prior to being utilized in the process for making a fibrous structure described above. In this case, the nonwoven substrate 44 would likely be in a parent roll that could be unwound into the fibrous structure making process and the solid additives 30 could be deposited directly onto a surface of the nonwoven substrate 44.

In one example, the step of providing a plurality of solid additives 30 onto the nonwoven substrate 44 may comprise airlaying the solid additives 30 using an airlaying former. A non-limiting example of a suitable airlaying former is available from Dan-Web of Aarhus, Denmark.

In one example, the step of providing fourth filaments 34 such that the filaments contact the solid additives 30 comprises the step of depositing the fourth filaments 34 such that at least a portion (in one example all or substantially all) of the solid additives 30 are contacted by the fourth filaments 34 thus positioning the solid additives 30 between the fourth layer 38 of filaments and the nonwoven substrate 44. Once the fourth layer 38 of filaments is in place, the fibrous structure 40 may be subjected to a bonding step that bonds the fourth layer 38 of filaments (in this case, the scrim 46) to the nonwoven substrate 44. This step of bonding may comprise a thermal bonding operation. The thermal bonding operation may comprise passing the fibrous structure 40 through a nip formed by thermal bonding rolls 48, 50. At least one of the thermal bonding rolls 48, 50 may comprise a pattern that is translated into the bond sites 52 formed in the fibrous structure 40.

In addition to being subjected to a bonding operation, the fibrous structure may also be subjected to other post-processing operations such as embossing, tuft-generating, gear rolling, which includes passing the fibrous structure through a nip formed between two engaged gear rolls, moisture-imparting operations, free-fiber end generating, and surface treating to form a finished fibrous structure. In one example, the fibrous structure is subjected to gear rolling by passing the fibrous structure through a nip formed by at least a pair of gear rolls. In one example, the fibrous structure is subjected to gear rolling such that free-fiber ends are created in the fibrous structure. The gear rolling may occur before or after two or more fibrous structures are combined to form a multi-ply sanitary tissue product. If it occurs after, then the multi-ply sanitary tissue product is passed through the nip formed by at least a pair of gear rolls.

The method for making a fibrous structure of the present invention may be close coupled (where the fibrous structure is convolutedly wound into a roll prior to proceeding to a converting operation) or directly coupled (where the fibrous structure is not convolutedly wound into a roll prior to proceeding to a converting operation) with a converting operation to emboss, print, deform, surface treat, or other post-forming operation known to those in the art. For purposes of the present invention, direct coupling means that the fibrous structure can proceed directly into a converting operation rather than, for example, being convolutedly wound into a roll and then unwound to proceed through a converting operation.

In one example, one or more plies of the fibrous structure according to the present invention may be combined, for example with glue, with another ply of fibrous structure, which may also be a fibrous structure according to the present invention, to form a multi-ply sanitary tissue product that exhibits a Tensile Ratio of 2 or less and/or less than 1.7 and/or less than 1.5 and/or less than 1.3 and/or less than 1.1 and/or greater than 0.7 and/or greater than 0.9 as measured according to the Dry Tensile Test Method described herein. In one example, the multi-ply sanitary tissue product may be formed by combining two or more plies of fibrous structure according to the present invention. In another example, two or more plies of fibrous structure according to the present invention may be combined to form a multi-ply sanitary tissue product such that the solid additives present in the fibrous structure plies are adjacent to each of the outer surfaces of the multi-ply sanitary tissue product.

The process of the present invention may include preparing individual rolls of fibrous structure and/or sanitary tissue product comprising such fibrous structure(s) that are suitable for consumer use.

Figure 3:
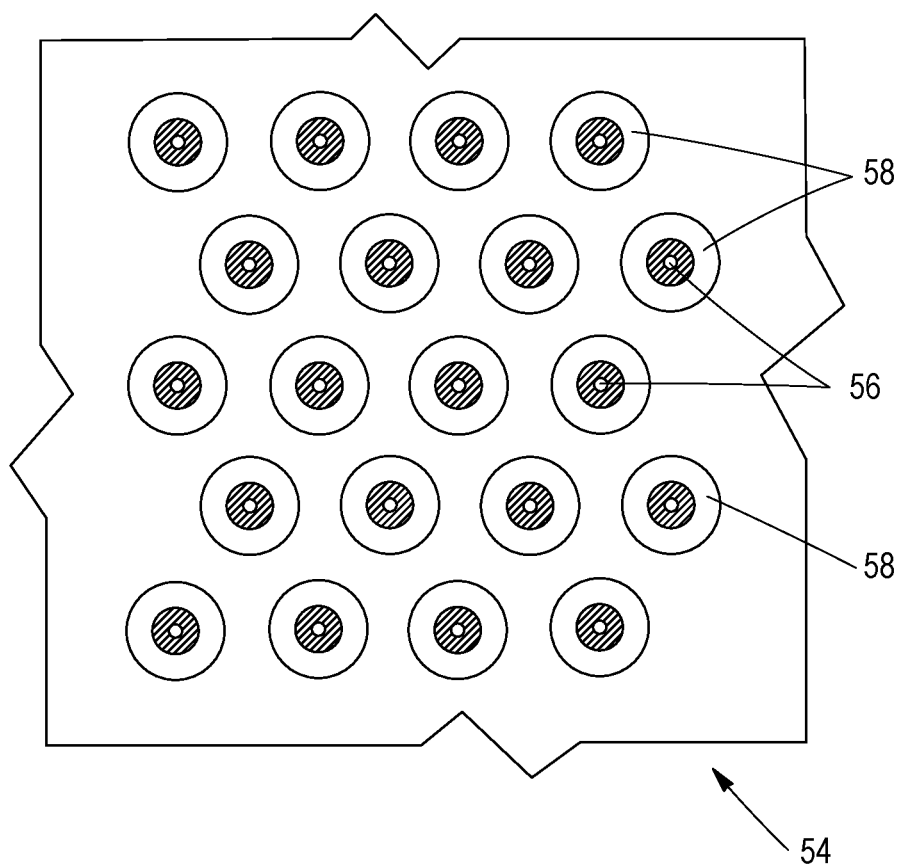
FIG. 3 is a schematic representation of an example of a meltblow die in accordance with the present invention.

In one example, the sources of filaments comprise meltblow dies that produce filaments from an aqueous polymer melt composition according to the present invention. In one example, as shown in FIG. 3 the meltblow die 54 may comprise at least one filament-forming hole 56, and/or 2 or more and/or 3 or more rows of filament-forming holes 56 from which filaments are spun. At least one row of the filament-forming holes 56 contains 2 or more and/or 3 or more and/or 10 or more filament-forming holes 56. In addition to the filament-forming holes 56, the meltblow die 54 comprises fluid-releasing holes 58, such as gas-releasing holes, in one example air-releasing holes, that provide attenuation to the filaments formed from the filament-forming holes 56. One or more fluid-releasing holes 58 may be associated with a filament-forming hole 56 such that the fluid exiting the fluid-releasing hole 58 is parallel or substantially parallel (rather than angled like a knife-edge die) to an exterior surface of a filament exiting the filament-forming hole 56. In one example, the fluid exiting the fluid-releasing hole 58 contacts the exterior surface of a filament formed from a filament-forming hole 56 at an angle of less than 30° and/or less than 20° and/or less than 10° and/or less than 5° and/or about 0°. One or more fluid releasing holes 58 may be arranged around a filament-forming hole 56. In one example, one or more fluid-releasing holes 58 are associated with a single filament-forming hole 56 such that the fluid exiting the one or more fluid releasing holes 58 contacts the exterior surface of a single filament formed from the single filament-forming hole 56. In one example, the fluid-releasing hole 58 permits a fluid, such as a gas, for example air, to contact the exterior surface of a filament formed from a filament-forming hole 56 rather than contacting an inner surface of a filament, such as what happens when a hollow filament is formed.

Aqueous Polymer Melt Composition

The aqueous polymer melt composition of the present invention from which the polysaccharide filaments are produced comprises a melt processed fibrous element-forming polymer, such as a melt processed hydroxyl polymer, for example a melt processed polysaccharide, and a crosslinking system comprising a crosslinking agent and a crosslinking facilitator, such as an ammonium alkylsulfonate salt and/or acid thereof, according to the present invention.

The aqueous polymer melt compositions may already be formed or a melt processing step may need to be performed to convert a raw material fibrous element-forming polymer, such as a polysaccharide, into a melt processed fibrous element-forming polymer, such as a melt processed polysaccharide, thus producing the aqueous polymer melt composition. A peak processing temperature to bring the aqueous polymer melt composition to between 170 to 175° C. should be applied to the aqueous polymer melt composition. This can be accomplished by heating through the barrel heating of a twin screw extruder or using a shell in tube heat exchanger. The aqueous polymer melt composition should be held at 170 to 175° C. for 1 to 2 minutes. If the aqueous polymer melt composition is at a peak temperature between 170 and 175° C. for residence times longer than 2 minutes unwanted side reactions may occur. Thus it is important to very quickly cool the aqueous polymer melt composition using a rapid quenching method, such as flash vaporization of the water phase. The crosslinking agent is added to the aqueous polymer melt composition after the cooling step. A suitable melt processing step known in the art may be used to convert the raw material fibrous element-forming polymer, for example the polysaccharide, into the melt processed fibrous element-forming polysaccharide. "Melt processing" as used herein means any operation and/or process by which a polymer is softened to such a degree that it can be brought into a flowable state.

The aqueous polymer melt compositions of the present invention may have a shear viscosity, as measured according to the Shear Viscosity of a Polymer Melt Composition Measurement Test Method described herein, of from about 0.5 Pascal·Seconds to about 25 Pascal·Seconds and/or from about 2 Pascal·Seconds to about 20 Pascal·Seconds and/or from about 3 Pascal·Seconds to about 10 Pascal·Seconds, as measured at a shear rate of 3,000 sec$^{-1}$ and at the processing temperature (50° C. to 100° C.). The aqueous polymer melt compositions may have a thinning index n value as measured according to the Shear Viscosity of a Polymer Melt Composition Measurement Test Method described herein of from about 0.4 to about 1.0 and/or from about 0.5 to about 0.8.

The aqueous polymer melt compositions may have a temperature of from about 50° C. to about 100° C. and/or from about 65° C. to about 95° C. and/or from about 70° C. to about 90° C. when spinning filaments from the aqueous polymer melt compositions.

In one example, the aqueous polymer melt composition of the present invention may comprise from about 30% and/or from about 40% and/or from about 45% and/or from about 50% to about 75% and/or to about 80% and/or to about 85% and/or to about 90% and/or to about 95% and/or to about 99.5% by weight of the aqueous polymer melt composition of a fibrous element-forming polymer, such as a polysaccharide. The fibrous element-forming polymer, such as a polysaccharide, may have a weight average molecular weight greater than 100,000 g/mol as determined by the Weight Average Molecular Weight Test Method described herein prior to any crosslinking.

A fast wetting surfactant may be present in the aqueous polymer melt compositions and/or may be added to the aqueous polymer melt composition before polymer processing of the aqueous polymer melt composition.

A non-hydroxyl polymer, such as polyacrylamide, may be present in the aqueous polymer melt composition and/or may be added to the aqueous polymer melt composition before polymer processing of the aqueous polymer melt composition.

A hueing agent may be present in the aqueous polymer melt compositions and/or may be added to the aqueous polymer melt composition before polymer processing the aqueous polymer melt composition. In one example, the fibrous structure comprises polysaccharide filaments comprising a hueing agent such that the fibrous structure exhibits a Whiteness Index of greater than 72 and/or greater than 75 and/or greater than 77 and/or greater than 80 as measured according to the Whiteness Index Test Method described herein.

Non-limiting Example—Synthesis of an Aqueous Polymer Melt Composition

An aqueous polymer melt composition of the present invention may be prepared using screw extruders, such as a vented twin screw extruder.

Figure 4A:
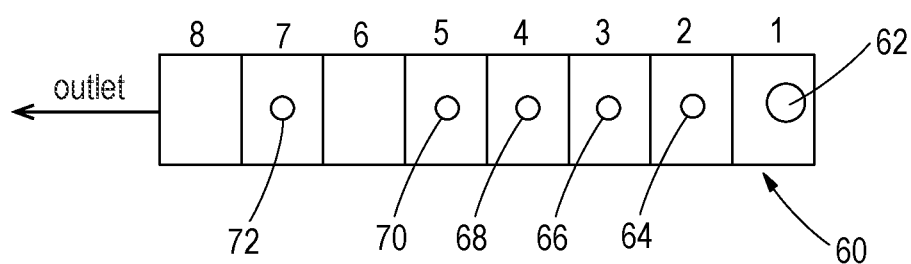
FIG. 4A is a schematic representation of an example of a barrel of a twin screw extruder in accordance with the present invention.

A barrel 60 of an APV Baker (Peterborough, England) 40:1, 58 mm diameter twin screw extruder is schematically illustrated in FIG. 4A. The barrel 60 is separated into eight zones, identified as zones 1-8. The barrel 60 encloses the extrusion screw and mixing elements, schematically shown in FIG. 4B, and serves as a containment vessel during the extrusion process. A solid feed port 62 is disposed in zone 1, a first liquid feed port 64 is disposed in zone 2, a second liquid feed port 66 is disposed in zone 3, a third liquid feed port 68 is disposed in zone 4, and a fourth liquid feed port 70 is disposed in zone 5. A vent 72 is included in zone 7 for cooling and decreasing the liquid, such as water, content of the mixture prior to exiting the extruder. An optional vent stuffer, commercially available from APV Baker, can be employed to prevent the polymer melt composition from exiting through the vent 72. The flow of the aqueous polymer melt composition through the barrel 60 is from zone 1 exiting the barrel 60 at zone 8.

Figure 4B:
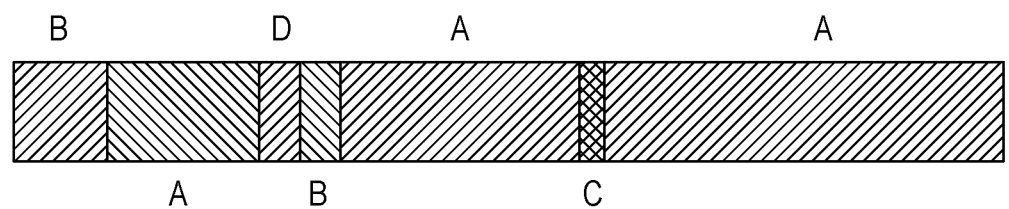
FIG. 4B is a schematic representation of an example of a screw and mixing element configuration for the twin screw extruder of FIG. 4A.

A screw and mixing element configuration for the twin screw extruder is schematically illustrated in FIG. 4B. The twin screw extruder comprises a plurality of twin lead screws (TLS) (designated A and B) and paddles (designated C) and reverse twin lead screws (RTLS) (designated D) installed in series as illustrated in Table 1 below.

TABLE 1

| Zone | Total Length Ratio | Element | Pitch | Length Ratio | Element Type |
|---|---|---|---|---|---|
| 1 | 1.5 | TLS | 1 | 1.5 | A |
| 1 | 3.0 | TLS | 1 | 1.5 | A |
| 1 | 4.5 | TLS | 1 | 1.5 | A |
| 2 | 6.0 | TLS | 1 | 1.5 | A |
| 2 | 7.5 | TLS | 1 | 1.5 | A |
| 2 | 9.0 | TLS | 1 | 1.5 | A |
| 3 | 10.5 | TLS | 1 | 1.5 | A |
| 3 | 12.0 | TLS | 1 | 1.5 | A |
| 3 | 13.0 | TLS | 1 | 1 | A |
| 3 | 14.0 | TLS | 1 | 1 | A |
| 4 | 15.0 | TLS | 1 | 1 | A |
| 4 | 16.0 | TLS | 1 | 1 | A |
| 4 | 16.3 | PADDLE | 0 | 0.25 | C |
| 4 | 16.5 | PADDLE | 0 | 0.25 | C |
| 4 | 18.0 | TLS | 1 | 1.5 | A |
| 4 | 19.5 | TLS | 1 | 1.5 | A |
| 5 | 21.0 | TLS | 1 | 1.5 | A |
| 5 | 22.5 | TLS | 1 | 1.5 | A |
| 5 | 24.0 | TLS | 1 | 1.5 | A |
| 5 | 25.0 | TLS | 1 | 1 | A |
| 6 | 25.3 | TLS | 1 | 0.25 | A |
| 6 | 26.3 | TLS | 1 | 1 | A |
| 6 | 27.3 | TLS | 1 | 1 | A |
| 6 | 28.3 | TLS | 0.5 | 1 | B |
| 6 | 29.3 | TLS | 0.5 | 1 | B |
| 6 | 29.8 | RTLS | 0.5 | 0.5 | D |
| 7 | 30.3 | RTLS | 0.5 | 0.5 | D |
| 7 | 30.8 | RTLS | 0.5 | 0.5 | D |
| 7 | 32.3 | TLS | 1 | 1.5 | A |
| 7 | 33.8 | TLS | 1 | 1.5 | A |
| 7 | 34.8 | TLS | 1 | 1 | A |
| 8 | 35.8 | TLS | 1 | 1 | A |
| 8 | 36.8 | TLS | 0.5 | 1 | B |
| 8 | 37.8 | TLS | 0.5 | 1 | B |
| 8 | 38.8 | TLS | 0.5 | 1 | B |
| 8 | 40.3 | TLS | 0.5 | 1.5 | B |

Screw elements (A-B) are characterized by the number of continuous leads and the pitch of these leads. A lead is a flight (at a given helix angle) that wraps the core of the screw element. The number of leads indicates the number of flights wrapping the core at any given location along the length of the screw. Increasing the number of leads reduces the volumetric capacity of the screw and increases the pressure generating capability of the screw.

The pitch of the screw is the distance needed for a flight to complete one revolution of the core. It is expressed as the number of screw element diameters per one complete revolution of a flight. Decreasing the pitch of the screw increases the pressure generated by the screw and decreases the volumetric capacity of the screw.

The length of a screw element is reported as the ratio of length of the element divided by the diameter of the element.

This example uses TLS and RTLS. Screw element type A is a TLS with a 1.0 pitch and varying length ratios. Screw element type B is a TLS with a 0.5 pitch and varying length ratios.

Bilobal paddles, C, serving as mixing elements, are also included in series with the SLS and TLS screw elements in order to enhance mixing. Paddle C has a length ratio of 1/4. Various configurations of bilobal paddles and reversing elements D, single and twin lead screws threaded in the opposite direction, are used in order to control flow and corresponding mixing time. Screw element D is a RTLS with a 0.5 pitch and a 0.5 length ratio.

In zone 1, one or more fibrous element-forming polymers, such as one or more hydroxyl polymers, are fed into the solid feed port 62 at a rate of 330 grams/minute using a K-Tron (Pitman, N.J.) loss-in-weight feeder. These hydroxyl polymers are combined inside the extruder (zone 2) with a fast wetting surfactant (Aerosol® MA-80) added at liquid feed port 64 (zone 2) at a rate of 12 grams/minute. Water, an external plasticizer, is added at the liquid feed port 64 (zone 2) at a rate of 25 grams/minute using a Milton Roy (Ivyland, Pa.) diaphragm pump (1.9 gallon per hour pump head) to form a hydroxyl polymer/fast wetting surfactant/water slurry. A crosslinking facilitator, such as ammonium methanesulfonate, may be added to the water at liquid feed port 64 (zone 2) also. Another fibrous element-forming polymer, such as a hydroxyl polymer, for example polyvinyl alcohol, may be added to the slurry at liquid feed port 68 (zone 3). A non-hydroxyl polymer, such as polyacrylamide may be added to the slurry at liquid feed port 64 (zone 2). Additional additives such as other surfactants, other non-hydroxyl polymers, other salts and/or acids may be added at various feed ports along the length of the barrel 60. This slurry is then conveyed down the barrel 60 of the extruder and cooked to produce an aqueous polymer melt composition comprising a melt processed hydroxyl polymer and a fast wetting surfactant. Table 2 describes the temperature, pressure, and corresponding function of each zone of the extruder.

TABLE 2

| Zone | Temp. (° F.) | Pressure | Description of Screw | Purpose |
|---|---|---|---|---|
| 1 | 70 | Low | Feeding/Conveying | Feeding and Mixing |
| 2 | 70 | Low | Conveying | Mixing and Conveying |
| 3 | 70 | Low | Conveying | Mixing and Conveying |
| 4 | 130 | Low | Pressure/Decreased Conveying | Conveying and Heating |
| 5 | 355 | Medium | Pressure Generating | Cooking at Pressure and Temperature |
| 6 | 355 | High | Reversing | Cooking at Pressure and Temperature |
| 7 | 355 | Low | Conveying | Cooling and Conveying (with venting) |
| 8 | 355 | Low | Pressure Generating | Conveying |

Figure 5A:
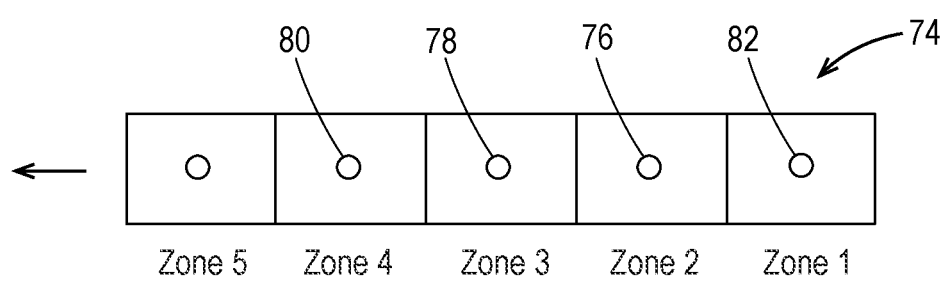
FIG. 5A is a schematic representation of an example of a barrel of a twin screw extruder suitable for use in the present invention.
Figure 5B:
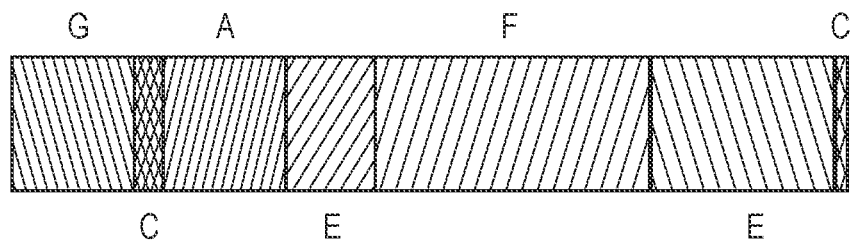
FIG. 5B is a schematic representation of an example of a screw and mixing element configuration suitable for use in the barrel of FIG. 5A.

After the aqueous polymer melt composition exits the first extruder, part of the aqueous polymer melt composition is dumped and another part (450 g) is fed into a Mahr (Charlotte, N.C.) gear pump and pumped to a second extruder. The second extruder provides a means to cool the polymer melt composition by venting the polymer melt composition to atmospheric pressure and provides additional points to incorporate additives. A barrel 74 of an APV Baker (Peterborough, England) 13:1, 70 mm diameter twin screw extruder is schematically illustrated in FIG. 5A as the second extruder. The barrel 74 is separated into five zones, identified as zones 1-5. The barrel 74 encloses the extrusion screw and mixing elements, schematically shown in FIG. 5B, and serves as containment vessel during the extrusion process. A first liquid feed port 76 is disposed in zone 2, a second liquid feed port 78 is disposed in zone 3, and a third liquid feed port 80 is disposed in zone 4. A vent 82 is included in zone 1 for cooling and decreasing the liquid, such as water, content of the mixture prior to exiting the second extruder. An optional vent stuffer, commercially available from APV Baker, can be employed to prevent the aqueous polymer melt composition from exiting through the vent 82. The flow of the aqueous polymer melt composition through the barrel 74 is from zone 2 exiting the barrel 74 at zone 5.

A screw and mixing element configuration for the second extruder consists of twin lead screws (TLS) (designated A, E, F), paddles (designated C), and single lead screws (SLS) (designated G) installed in series as illustrated in Table 3 below.

TABLE 3

| Zone | Total Length Ratio | Element | Pitch | Length Ratio | Element Type | Purpose |
|---|---|---|---|---|---|---|
| 1 | 0.25 | Paddle | 0 | 0.25 | C | Mixing |
| 1 | 1.75 | TLS | 2 | 1.5 | E | Vent Location |
| 2 | 3.25 | TLS | 2 | 1.5 | E | Conveying |
| 2 | 4.75 | TLS | 3 | 1.5 | F | Feed Inlet Location |
| 3 | 6.25 | TLS | 3 | 1.5 | F | Conveying |
| 3 | 7.75 | TLS | 3 | 1.5 | F | Conveying |
| 4 | 9.25 | TLS | 2 | 1.5 | E | Conveying |
| 4 | 10.25 | TLS | 1 | 1 | A | Conveying |
| 4 | 11.25 | TLS | 1 | 1 | A | Conveying |
| 4 | 11.38 | Paddle | 0 | 0.125 | C | Mixing |
| 4 | 11.50 | Paddle | 0 | 0.125 | C | Mixing |
| 5 | 11.63 | Paddle | 0 | 0.125 | C | Mixing |
| 5 | 11.75 | Paddle | 0 | 0.125 | C | Mixing |
| 5 | 12.75 | SLS | 0.5 | 1 | G | Conveying |
| 5 | 13.75 | SLS | 0.5 | 1 | G | Conveying |

The aqueous polymer melt composition comprising the melt processed hydroxyl polymer and fast wetting surfactant coming from the first extruder is fed into the second extruder at a point about 5 L/D down the barrel, liquid feed port 76 (zone 2). A vent 82 open to atmospheric pressure is situated at about 1.5 L/D down the barrel 74 (zone 1). Some water vapor escapes from the aqueous polymer melt composition and exits through the vent 82. Water, an external plasticizer, and a crosslinking facilitator, such as ammonium methanesulfonate, may be added at the liquid feed port 78 (zone 3). A non-hydroxyl polymer, such as polyacrylamide, may be added at liquid feed port 80 (zone 4). Additional additives such as other surfactants, other non-hydroxyl polymers, other salts and/or acids may be added at various feed ports along the length of the barrel 74. The aqueous polymer melt composition is then conveyed through the extruder to the end of the barrel 74 (zone 5).

At least a portion of the aqueous polymer melt composition is then dumped and another part (400 g) is fed into a Mahr (Charlotte, N.C.) gear pump and pumped into a SMX style static mixer (Koch-Glitsch, Woodridge, Ill.). The static mixer is used to combine additional additives such as crosslinking agents, for example an imidazolidinone, crosslinking facilitators, such as ammonium methanesulfonate, external plasticizers, such as water, with the aqueous polymer melt composition comprising the melt processed hydroxyl polymer and fast wetting surfactant. The additives are pumped into the static mixer via PREP 100 HPLC pumps (Chrom Tech, Apple Valley MN). These pumps provide high pressure, low volume addition capability. The aqueous polymer melt composition of the present invention is now ready to be processed by a polymer processing operation.

b. Polymer Processing

"Polymer processing" as used herein means any operation and/or process by which a polymeric structure comprising a processed hydroxyl polymer is formed from an aqueous polymer melt composition comprising a melt processed hydroxyl polymer. Non-limiting examples of polymer processing operations include extrusion, molding and/or fiber spinning Extrusion and molding (either casting or blown), typically produce films, sheets and various profile extrusions. Molding may include injection molding, blown molding and/or compression molding. Fiber spinning may include spun bonding, melt blowing, rotary spinning, continuous filament producing and/or tow fiber producing.

A "processed hydroxyl polymer" as used herein means any hydroxyl polymer that has undergone a melt processing operation and a subsequent polymer processing operation.

c. Polymeric Structure

The aqueous polymer melt composition can be subjected to one or more polymer processing operations such that the polymer melt composition is processed into a polymeric structure comprising the hydroxyl polymer and a crosslinking system according to the present invention.

"Polymeric structure" as used herein means any physical structure formed as a result of processing an aqueous polymer melt composition in accordance with the present invention. Non-limiting examples of polymeric structures in accordance with the present invention include fibrous elements (such as filaments and/or fibers) and/or fibrous structures comprising such fibrous elements.

A crosslinking system via a crosslinking agent and ammonium alkylsulfonate salt, a crosslinking facilitator, may be able to crosslink the processed hydroxyl polymers together to produce the polymeric structure of the present invention, with or without being subjected to a curing step. In other words, the crosslinking system in accordance with the present invention acceptably crosslinks the processed hydroxyl polymers of a processed polymer melt composition together via the crosslinking agent to form an integral polymeric structure, such as a fibrous element. The crosslinking agent can function as a "building block" for the polymeric structure. In one example, without the crosslinking agent, no polymeric structure in accordance with the present invention could be formed.

Polymeric structures of the present invention do not include coatings and/or other surface treatments that are applied to a pre-existing form, such as a coating on a fibrous element, film or foam. However, in one example of the present invention, a polymeric structure, such as a fibrous element, in accordance with the present invention may be coated and/or surface treated with a crosslinking system of the present invention.

In one example, the fibrous structure of the present invention comprises at least one surface that comprises a coating comprising one or more hueing agents.

In one example, the polymeric structure produced via a polymer processing operation may be cured at a curing temperature of from about 110° C. to about 215° C. and/or from about 110° C. to about 200° C. and/or from about 120° C. to about 195° C. and/or from about 130° C. to about 185° C. for a time period of from about 0.01 and/or 1 and/or 5 and/or 15 seconds to about 60 minutes and/or from about 20 seconds to about 45 minutes and/or from about 30 seconds to about 30 minutes. Alternative curing methods may include radiation methods such as UV, e-beam, IR and other temperature-raising methods.

Further, the polymeric structure may also be cured at room temperature for days, either after curing at above room temperature or instead of curing at above room temperature.

The polymeric structures of the present invention may include melt spun fibers and/or spunbond fibers, staple fibers, hollow fibers, shaped fibers, such as multi-lobal fibers and multicomponent fibers, especially bicomponent fibers. The multicomponent fibers, especially bicomponent fibers, may be in a side-by-side, sheath-core, segmented pie, ribbon, islands-in-the-sea configuration, or any combination thereof. The sheath may be continuous or non-continuous around the core. The ratio of the weight of the sheath to the core can be from about 5:95 to about 95:5. The fibers of the present invention may have different geometries that include round, elliptical, star shaped, rectangular, and other various eccentricities.

One or more polymeric structures of the present invention may be incorporated into a multi-polymeric structure product, such as a fibrous structure and/or web, if the polymeric structures are in the form of fibers. Such a multi-polymeric structure product may ultimately be incorporated into a commercial product, such as a single- or multi-ply sanitary tissue product, such as facial tissue, bath tissue, paper towels and/or wipes, feminine care products, diapers, writing papers, cores, such as tissue cores, and other types of paper products.

Non-limiting examples of processes for preparing polymeric structures in accordance with the present invention follow.

i) Fibrous Element Formation

Figure 6:
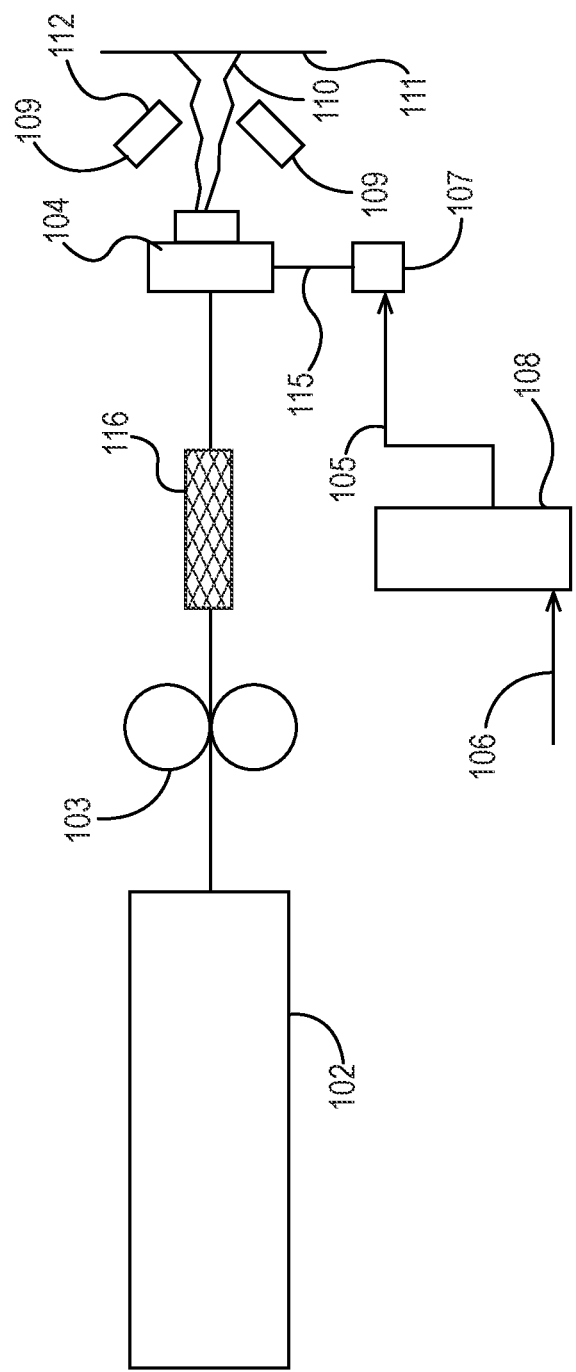
FIG. 6 is a schematic representation of an example of a process for synthesizing a fibrous element in accordance with the present invention.

An aqueous polymer melt composition comprising a melt processed hydroxyl polymer and a fast wetting surfactant is prepared according to the Synthesis of an Aqueous Polymer Melt Composition described above. As shown in FIG. 6, the aqueous polymer melt composition may be processed into a fibrous element. The aqueous polymer melt composition present in an extruder 102 is pumped to a die 104 using pump 103, such as a Zenith®, type PEP II, having a capacity of 10 cubic centimeters per revolution (cc/rev), manufactured by Parker Hannifin Corporation, Zenith Pumps division, of Sanford, N.C., USA. The aqueous polymer melt composition's flow to die 104 is controlled by adjusting the number of revolutions per minute (rpm) of the pump 103. Pipes connecting the extruder 102, the pump 103, the die 104, and optionally a mixer 116 are electrically heated and thermostatically controlled to 65° C.

Figure 7:
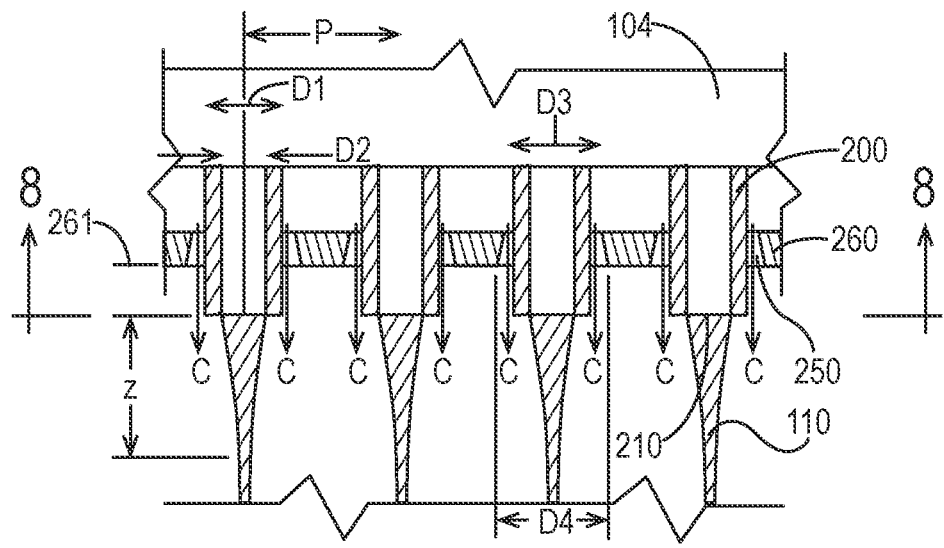
FIG. 7 is a schematic representation of a partial side view of the process shown in FIG. 6 showing an example of an attenuation zone.
Figure 8:
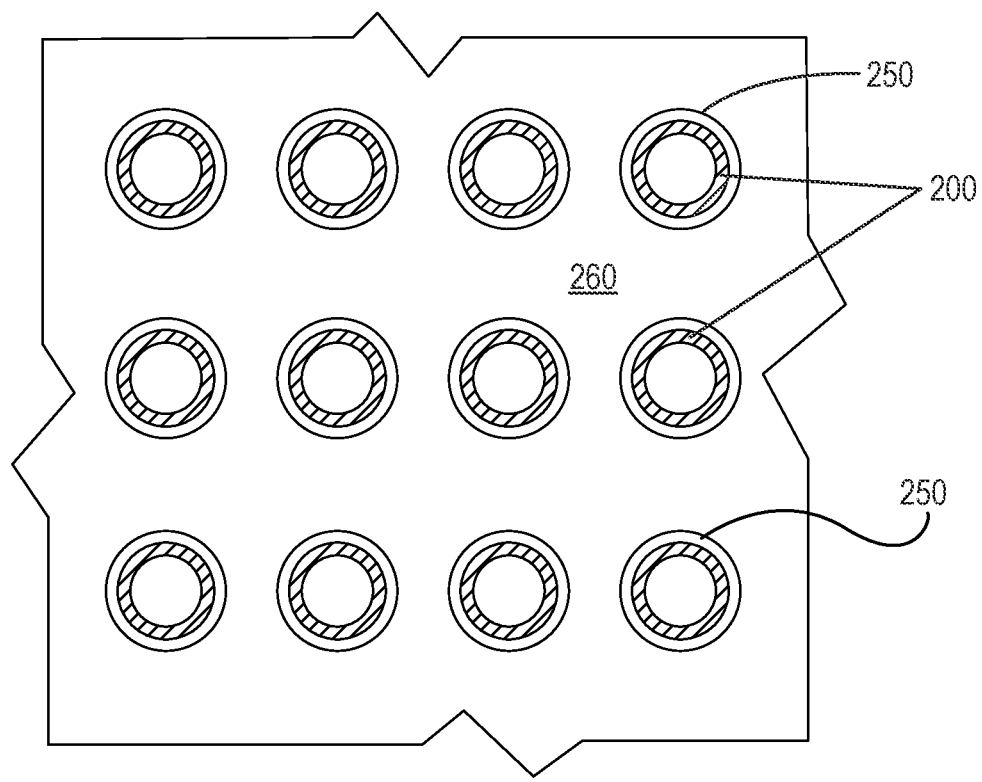
FIG. 8 is a schematic plan view taken along lines 8-8 of FIG. 7 and showing one possible arrangement of a plurality of extrusion nozzles arranged to provide fibrous elements of the present invention.

The die 104 has several rows of circular extrusion nozzles 200 spaced from one another at a pitch P (FIG. 7) of about 2.489 millimeters (about 0.098 inches). The nozzles are arranged in a staggered grid with a spacing of 2.489 millimeters (about 0.098 inches) within rows and a spacing of 2.159 millimeters (about 0.085 inches) between rows. The nozzles 200 have individual inner diameters D2 of about 0.254 millimeters (about 0.010 inches) and individual outside diameters (D1) of about 0.813 millimeters (about 0.032 inches). Each individual nozzle 200 is encircled by an annular orifice 250 formed in a plate 260 (FIGS. 7 and 8) having a thickness of about 1.9 millimeters (about 0.075 inches). A pattern of a plurality of the orifices 250 in the plate 260 correspond to a pattern of extrusion nozzles 200. Once the orifice plate is combined with the dies, the resulting area for airflow is about 36 percent. The plate 260 is fixed so that the embryonic filaments 110 being extruded through the nozzles 200 are surrounded and attenuated by generally cylindrical, humidified air streams supplied through the orifices 250. The nozzles can extend to a distance from about 1.5 mm to about 4 mm, and more specifically from about 2 mm to about 3 mm, beyond a surface 261 of the plate 260 (FIG. 7). As shown in FIG. 9, a plurality of boundary-air orifices 300, is formed by plugging nozzles of two outside rows on each side of the plurality of nozzles, as viewed in plane, so that each of the boundary-layer orifice comprised a annular aperture 250 described herein above. Additionally, every other row and every other column of the remaining capillary nozzles are blocked, increasing the spacing between active capillary nozzles As shown in FIG. 6, attenuation air can be provided by heating compressed air from a source 106 by an electrical-resistance heater 108, for example, a heater manufactured by Chromalox, Division of Emerson Electric, of Pittsburgh, Pa., USA. An appropriate quantity of steam 105 at an absolute pressure of from about 240 to about 420 kiloPascals (kPa), controlled by a globe valve (not shown), is added to saturate or nearly saturate the heated air at the conditions in the electrically heated, thermostatically controlled delivery pipe 115. Condensate is removed in an electrically heated, thermostatically controlled, separator 107. The attenuating air has an absolute pressure from about 130 kPa to about 310 kPa, measured in the pipe 115. The filaments 110 being extruded have a moisture content of from about 20% and/or from about 25% to about 50% and/or to about 55% by weight. The filaments 110 are dried by a drying air stream 109 having a temperature from about 149° C. (about 300° F.) to about 315° C. (about 600° F.) by an electrical resistance heater (not shown) supplied through drying nozzles 112 and discharged at an angle generally perpendicular relative to the general orientation of the embryonic fibers being extruded. The filaments 110 are dried from about 45% moisture content to about 15% moisture content (i.e., from a consistency of about 55% to a consistency of about 85%) and are collected on a collection device 111, such as, for example, a movable foraminous belt.

The process parameters are as follows in Table 4.

TABLE 4

| Sample | Units | |
|---|---|---|
| Attenuation Air Flow Rate | G/min | 9000 |
| Attenuation Air Temperature | ° C. | 65 |
| Attenuation Steam Flow Rate | G/min | 1800 |
| Attenuation Steam Gage Pressure | kPa | 213 |
| Attenuation Gage Pressure in Delivery Pipe | kPa | 14 |
| Attenuation Exit Temperature | ° C. | 65 |
| Solution Pump Speed | Revs/min | 12 |
| Solution Flow | G/min/hole | 0.18 |
| Drying Air Flow Rate | g/min | 17000 |
| Air Duct Type | | Slots |
| Air Duct Dimensions | mm | 356 × 127 |
| Velocity via Pitot-Static Tube | M/s | 65 |
| Drying Air Temperature at Heater | ° C. | 260 |
| Dry Duct Position from Die | mm | 80 |
| Drying Duct Angle Relative to Fibers | degrees | 0 |
| Drying Duct to Drying Duct Spacing | mm | 205 |
| Die to Forming Box distance | Mm | 610 |
| Forming Box Machine direction Length | Mm | 635 |
| Forming Box Cross Direction Width | Mm | 380 |
| Forming Box Flowrate | g/min | 41000 |

Non-Limiting Examples of Fibrous Structures

The materials used in the Examples set forth below are as follows:

CPI 050820-156 is an acid-thinned, dent corn starch with a weight average molecular weight of 2,000,000 g/mol supplied by Corn Products International, Westchester, Ill.

Hyperfloc NF301 and Hyperfloc NF221 are nonionic polyacrylamides (PAAM) with an average molecular weight between 5,000,000 and 6,000,000 g/mol and 4,000,000 and 5,000,000 g/mol, respectively, and is supplied by Hychem, Inc.

Aerosol MA-80-PG is an anionic sodium dihexyl sulfosuccinate surfactant supplied by Cytec Industries, Inc., Woodland Park, N.J.

RSA UGA is a purified crosslinking agent supplied by RSA Corporation, Danbury, Conn.

Freerez DHEU is a crosslinking agent supplied as a 20% solution by Emerald Performance Materials, Charlotte, N.C.

Ammonium Chloride ($NH_4Cl$) is used as an acid catalyst supplied by BASF.

Ammonium Methane Sulfonate with Ammonium Sulfate (10% AMS/1% AS) is an ammonium alkylsulfonate salt derivative used as an acid catalyst and is made in house.

Liquitint Violet CT and Liquitint Violet DD are concentrated liquid hueing dyes supplied by Milliken Chemical, Spartanburg, S.C.

Permasil Blue GFD 150% (Disperse Blue 102) and Permalite Fast Violet B 200% (Direct Violet 9) are concentrated powder hueing dyes supplied by Standard Dyes, High Point, N.C.

Reactive Blue 109 Crude is a concentrated powder hueing dye commercially available from Aakash Chemicals and Dyestuffs Inc., Glendale Heights, Ill.)

In the examples presented below, Liquitint Violet CT and Liquitint Violet DD are prepared by diluting the concentrated liquid in water to a final concentration of 0.1 wt %. Permasil Blue GFD, Permalite Fast Violet B, or Reactive Blue 109 Crude are prepared by weighing out the appropriate amount of powder and mixing well in water to a final concentration of 0.1 wt % while ensuring that the pH is controlled to prevent any reactive dyes from hydrolyzing. Hueing dyes such as Violet CT are added to the melt mixture at the SMX style static mixer as previously described on page 35 lines 1-10. The melt composition at this point in the process is 50-55% total solids.

All examples contain 90% CPI starch, 1.5% Aerosol MA-80-PG surfactant, 0.8% Hyperfloc NF221 polyacrylaminde, and 0.2% Hyperfloc NF301 polyacrylamide. Examples will vary in UGA type such as RSA or Freerez, UGA composition ranging from 3.5% to 5.0%, acid catalyst such as NH₄Cl or AMS/AS ranging from 0.5-2%, and hueing dye such as Violet CT, Violet DD, Permasil Blue GFD, Permalite Fast Violet B, or Reactive Blue 109 Crude as described in Table 5 below:

The filaments and fibrous structures of the Table 5 examples are generally prepared as follows, except that the ingredients in the examples of Table 5 may be missing or different from the following process. Where appropriate in the examples of Table 5, one or more hueing agents are added to the melt.

A PAAM solution is prepared by dissolving dry Hyperfloc NF301 in water to a final concentration of 2.2 wt %. To ensure complete dissolution, the polymer is dissolved under high shear conditions using a high speed mixer. The resulting Hyperfloc NF301 solution has a weight average molecular weight of 4,000,000 g/mol. It should be noted that a higher polyacrylamide molecular weight may be obtained by dissolving the dry polymer at dilute concentration and gentle stirring. However, a dilute polymer solution would not be useful for the present example. At 25° C. the solution has a shear viscosity approximately 100 Pa*s, and an extensional viscosity of approximately 1000 Pa*s at a Hencky strain of 7.

The 2.2% Hyperfloc NF301 solution is delivered to zone one of a 40:1 APV Baker twin-screw extruder with eight temperature zones. There, it is melt processed with CPI 050820-156 starch, ammonium chloride, Aerosol MA-80-PG surfactant, and water. The melt composition reaches a peak temperature of 170 to 175° C. in the cook extruder. The composition in the extruder is 35-45% water where the make-up of solids is 97.2% CPI 050820-156, 1.5% Aerosol MA-80-PG, 0.8% Hyperfloc NF301 polyacrylamide, and 0.5% crosslinking facilitator. This mixture is then conveyed down the barrel through zones 2 through 8 and cooked into a melt-processed hydroxyl polymer composition. From the extruder, the melt is fed to a Mahr gear pump, and then delivered to a second extruder. The second extruder is a 13:1 APV Baker twin screw, which serves to cool the melt by venting a stream to atmospheric pressure. The second extruder also serves as a location for additives to the hydroxyl polymer melt. Particularly, a second stream of 2.2% Hyperfloc NF301 polyacrylamide is introduced at a level of 0.2% on a solids basis. This raises the total Hyperfloc NF301 level to 1.0% of the solids. The material that is not vented is conveyed down the extruder to a second Mahr melt pump. From here, the hydroxyl polymer melt is delivered to a series of static mixers where a cross-linker, activator, and water are added. The melt composition at this point in the process is 43-55% total solids. On a solids basis the melt is comprised of 90.5% CPI 050820-156 starch, 5% crosslinking agent, 0.5-2% crosslinking facilitator (for example 2% ammonium chloride or 0.5% AMS/AS), 1.5% surfactant, 0.8% Hyperfloc NF221 polyacrylamide, and 0.2% NF301 polyacrylamide. From the static mixers the composition is delivered to a melt blowing die via a melt pump to produce filaments The resulting attenuated filaments have diameters ranging from 1 to 10 microns, and contain polyacrylamide with a weight average molecular weight of 1,300,000 to 2,000,000 g/mol, and MWD of greater than 1.3. The entanglement concentration of PAAM is roughly 0.70% and 0.45% for a 1,300,000 g/mol and 2,000,000 g/mol polyacrylamide respectively. Thus, the composition of Hyperfloc NF301 in the fiber is anywhere from 1.4 to 2.2 times its entanglement concentration. The fibrous structure is formed on a collection device, a belt, that is subjected to a vacuum box having a vacuum box velocity of less than 14 ft/second. The resulting fibrous structure exhibits a basis weight of 18 g/m² and a TEA of 3.05 g/in/gsm.

TABLE 5

| Starch | 90% CPI 050820-156 |
| --- | --- |
| Surfactant | 1.5% Aerosol MA-80-PG |
| Polyacrylamide | 0.8% Hyperfloc NF221 |
| Polyacrylamide | 0.2% Hyperfloc NF301 |

| | Example 1 Control | Example 2 | Example 3 Control | Example 4 | Example 5 | Example 6 Control | Example 7 | Example 8 | Example 9 Control |
| --- | --- | --- | --- | --- | --- | --- | --- | --- | --- |
| UGA | 5.0% RSA | 5.0% RSA | 3.5% Freerez DHEU | 3.5% Freerez DHEU | 3.5% Freerez DHEU | 5.5% Freerez DHEU | 5.5% Freerez DHEU | 5.5% Freerez DHEU | 5.0% RSA |
| Acid Catalyst | 2% NH₄Cl | 2% NH₄Cl | 2% NH₄Cl | 2% NH₄Cl | 2% NH₄Cl | 2% NH₄Cl | 2% NH₄Cl | 2% NH₄Cl | 0.5% AMS/AS |
| Hueing Dye | 0% | 0.003% Violet CT | 0% | 0.002% Violet CT | 0.003% Violet CT | 0% | 0.003% Violet CT | 0.004% Violet CT | 0% |

TABLE 5-continued

| Starch | 90% CPI 050820-156 | | | | | | | | |
|---|---|---|---|---|---|---|---|---|---|
| Surfactant | 1.5% Aerosol MA-80-PG | | | | | | | | |
| Polyacrylamide | 0.8% Hyperfloc NF221 | | | | | | | | |
| Polyacrylamide | 0.2% Hyperfloc NF301 | | | | | | | | |
| L | 93.0 | 90.2 | 89.7 | 90.2 | 89.4 | 92.5 | 88.9 | 88.6 | 94.9 |
| a | −0.98 | −0.58 | −0.69 | −0.73 | −0.59 | −1.9 | −1.3 | −1.2 | −1.8 |
| b | 6.8 | 3.1 | 7.0 | 4.3 | 3.3 | 10.1 | 6.0 | 4.1 | 6.3 |
| WI | 69.9 | 79.4 | 66.8 | 75.2 | 77.9 | 56.5 | 67.0 | 72.7 | 70.6 |
| Absolute Hue Angle | 98 | 101 | 96 | 100 | 100 | 101 | 102 | 106 | 106 |
| Δa | n/a | 0.40 | n/a | −0.04 | 0.1 | n/a | 0.6 | 0.7 | n/a |
| Δb | n/a | −3.7 | n/a | −2.7 | −3.7 | n/a | −4.1 | −6.0 | n/a |
| relative hue angle | n/a | 276 | n/a | 269 | 272 | n/a | 278 | 277 | n/a |

| | Example 10 | Example 11 Control | Example 12 | Example 13 | Example 14 | Example 15 | Example 16 | Example 17 | Example 18 |
|---|---|---|---|---|---|---|---|---|---|
| UGA | 5.0% Freerez DHEU | 5.5% Freerez DHEU | 5.5% Freerez DHEU | 5.5% Freerez DHEU | 3.5% Freerez DHEU | 3.5% Freerez DHEU | 3.5% Freerez DHEU | 3.5% Freerez DHEU | 3.5% Freerez DHEU |
| Acid Catalyst | 0.5% AMS/AS | 0.5% AMS/AS | 0.5% AMS/AS | 0.5% AMS/AS | 2% NH₄Cl | 2% NH₄Cl | 2% NH₄Cl | 2% NH₄Cl | 2% NH₄Cl |
| Hueing Dye | 0.00 2% Violet CT | 0% | 0.00 2% Violet CT | 0.00 3% Violet CT | 0% | 0.00 2% Violet CT | 0.00 3% Permalite Fast Violet B | 0.00 3% Permasil Blue GFD | 0.00 3% Reactive Blue 109 |
| L | 91.0 | 93.6 | 90.2 | 89.6 | 92.1 | 89.6 | 90.1 | 90.8 | 91.4 |
| a | −0.8 | −2.4 | −1.6 | −0.5 | −1.0 | −0.7 | 0.5 | −1.8 | −2.1 |
| b | 2.4 | 8.9 | 4.9 | 3.0 | 7.5 | 4.3 | 4.6 | 6.7 | 5.9 |
| WI | 81.4 | 59.7 | 70.7 | 79.1 | 66.6 | 74.6 | 77.8 | 65.3 | 67.4 |
| Absolute Hue Angle | 108 | 105 | 108 | 99 | 98 | 99 | 84 | 105 | 110 |
| Δa | 1.00 | n/a | 0.80 | 1.90 | n/a | 0.30 | 1.50 | −0.80 | −1.10 |
| Δb | −3.9 | n/a | −4.0 | −5.9 | n/a | −3.2 | −2.9 | −0.8 | −1.6 |
| relative hue angle | 284 | n/a | 281 | 288 | n/a | 275 | 297 | 225 | 236 |

| | | Example 19 | Example 20 | Example 21 | Example 22 | Example 23 | Example 24 | Example 25 |
|---|---|---|---|---|---|---|---|---|
| | UGA | 5.5% Freerez DHEU | 5.5% Freerez DHEU | 5.5% Freerez DHEU | 5.5% Freerez DHEU | 5.5% Freerez DHEU | 5.5% Freerez DHEU | 5.5% Freerez DHEU |
| | Acid Catalyst | 2% NH₄Cl | 2% NH₄Cl | 2% NH₄Cl | 2% NH₄Cl | 2% NH₄Cl | 2% NH₄Cl | 2% NH₄Cl |
| | Hueing Dye | 0% | 0.00 3% Violet DD | 0% | 0.00 3% Violet CT | 0.00 3% Permalite Fast Violet B | 0.00 3% Permasil Blue GFD | 0.00 3% Reactive Blue 109 |
| | L | 93.1 | 88.9 | 92.5 | 88.9 | 90.4 | 91.4 | 90.9 |
| | A | −1.9 | −1.5 | −1.9 | −1.3 | −0.3 | −2.9 | −2.7 |
| | B' | 9.4 | 5.7 | 10.1 | 6.0 | 6.1 | 8.1 | 7.5 |
| | WI | 59.4 | 67.3 | 56.5 | 67.0 | 71.2 | 58.4 | 60.3 |
| | Absolute Hue Angle | 101 | 105 | 101 | 102 | 93 | 110 | 110 |
| | Δa | n/a | 0.35 | n/a | 0.60 | 1.60 | −1.00 | −0.80 |
| | Δb | n/a | −3.7 | n/a | −4.1 | −4.0 | −2.0 | 2.6 |
| | relative hue angle | n/a | 275 | n/a | 278 | 292 | 243 | 253 |

Test Methods

Unless otherwise specified, all tests described herein including those described under the Definitions section and the following test methods are conducted on samples that have been conditioned in a conditioned room at a temperature of 23° C.±1.0° C. and a relative humidity of 50%±2% for a minimum of 12 hours prior to the test. All plastic and paper board packaging articles of manufacture, if any, must be carefully removed from the samples prior to testing. The samples tested are "usable units." "Usable units" as used herein means sheets, flats from roll stock, pre-converted flats, and/or single or multi-ply products. Except where noted all tests are conducted in such conditioned room, all tests are conducted under the same environmental conditions and in such conditioned room. Discard any damaged product. Do not test samples that have defects such as wrinkles, tears, holes, and like. All instruments are calibrated according to manufacturer's specifications.

Basis Weight Test Method

Basis weight of a fibrous structure is measured on stacks of twelve usable units using a top loading analytical balance with a resolution of ±0.001 g. The balance is protected from air drafts and other disturbances using a draft shield. A precision cutting die, measuring 8.890 cm±0.00889 cm by 8.890 cm±0.00889 cm is used to prepare all samples.

With a precision cutting die, cut the samples into squares. Combine the cut squares to form a stack twelve samples thick. Measure the mass of the sample stack and record the result to the nearest 0.001 g.

The Basis Weight is calculated in g/m² as follows:

Basis Weight=(Mass of stack)/[(Area of 1 square in stack)×(No. of squares in stack)]Basis Weight (g/m²)=Mass of stack (g)/[79.032 (cm²)/10,000 (cm²/m²)×12]

Report result to the nearest 0.1 g/m². Sample dimensions can be changed or varied using a similar precision cutter as mentioned above, so as at least 645 square centimeters of sample area is in the stack.

Average Diameter Test Method

A fibrous structure comprising fibrous elements of appropriate basis weight (approximately 5 to 20 grams/square meter) is cut into a rectangular shape, approximately 20 mm by 35 mm. The sample is then coated using a SEM sputter coater (EMS Inc, PA, USA) with gold so as to make the fibers relatively opaque. Typical coating thickness is between 50 and 250 nm. The sample is then mounted between two standard microscope slides and compressed together using small binder clips. The sample is imaged using a 10× objective on an Olympus BHS microscope with the microscope light-collimating lens moved as far from the objective lens as possible. Images are captured using a Nikon D1 digital camera. A Glass microscope micrometer is used to calibrate the spatial distances of the images. The approximate resolution of the images is 1 μm/pixel. Images will typically show a distinct bimodal distribution in the intensity histogram corresponding to the fibers and the background. Camera adjustments or different basis weights are used to achieve an acceptable bimodal distribution. Typically 10 images per sample are taken and the image analysis results averaged.

The images are analyzed in a similar manner to that described by B. Pourdeyhimi, R. and R. Dent in "Measuring fiber diameter distribution in nonwovens" (Textile Res. J. 69(4) 233-236, 1999). Digital images are analyzed by computer using the MATLAB (Version. 6.1) and the MATLAB Image Processing Tool Box (Version 3.) The image is first converted into a grayscale. The image is then binarized into black and white pixels using a threshold value that minimizes the intraclass variance of the thresholded black and white pixels. Once the image has been binarized, the image is skeltonized to locate the center of each fiber in the image. The distance transform of the binarized image is also computed. The scalar product of the skeltonized image and the distance map provides an image whose pixel intensity is either zero or the radius of the fiber at that location. Pixels within one radius of the junction between two overlapping fibers are not counted if the distance they represent is smaller than the radius of the junction. The remaining pixels are then used to compute a length-weighted histogram of fiber diameters contained in the image.

Whiteness Index and Hue Angle Test Method

Color (in this case Whiteness) is measured using a diffuse/8° sphere spectrophotometer (X-Rite SP62). The spectrophotometer is calibrated against a white and a black ceramic tile according to manufacturer's instructions and set to calculate Hunter values (L, a, b) with C² illuminant.

The color measurement of a fibrous structure is performed by stacking a two or more usable units of the fibrous structure on top of one another such that a basis weight of the stacked usable units of at least 100 g/m² is achieved for the area of the stack of usable units to be measured within the measurement area of the spectrophotometer. The stack of usable units is then placed flat against a white ceramic tile background.

Absolute color values of the fibrous structure are determined by taking the average of nine absolute color value measurements from both the top and the bottom surfaces on the stack of usable units.

Whiteness Index (WI) of the fibrous structure is calculated using the Stensby equation:

$$WI=L-3b+3a$$

Absolute Hue Angle (h°) of the fibrous structure is obtained as follows:
1) If both a and b values as measured above are less than 0.10, the Absolute Hue Angle cannot be reliably determined and the fibrous structure is outside the scope of the present invention for any claim requiring an Absolute Hue Angle.
2) If either a or b values as measured above are equal to or greater than 0.10, place the value of a and the value of b in cell A1 and cell B1, respectively, of a Microsoft Excel 2007 (or newer version) Spreadsheet and calculate the Absolute Hue Angle)(h° in cell C1 by placing in cell C1 the following formula:

$$=IF(B1<0, 360+DEGREES(A\ TAN\ 2(A1,B1)), DEGREES\ (A\ TAN\ 2(A1,B1)))$$

Relative Hue Angle (Δh°) of a fibrous structure is obtained as follows:
1) Measure the a and b values as described above of a fibrous structure without a hueing agent ($a_{control}$, $b_{control}$, respectively).
2) Measure the a and b values as described above of the same fibrous structure but with a hueing agent present ($a_{sample}$, $b_{sample}$, respectively).
3) Calculate the differences in the a and b values as follows:

$$\Delta a = a_{sample} - a_{control}$$

$$\Delta b = b_{sample} - b_{control}$$

4) If both Δa and Δb values are less than 0.10, the Relative Hue Angle cannot be reliably determined and the fibrous structure is outside the scope of the present invention for any claim requiring a Relative Hue Angle.
5) If either Δa or Δb values are equal to or greater than 0.10, place the value of a and the value of b in cell A1 and cell B1, respectively, of a Microsoft Excel 2007 (or newer version) Spreadsheet and calculate the Relative Hue Angle (Δh°) in cell C1 by placing in cell C1 the following formula:

$$=IF(B1<0, 360+DEGREES(A\ TAN\ 2(A1,B1)), DEGREES\ (A\ TAN\ 2(A1,B1)))$$

Weight Average Molecular Weight Test Method

The weight average molecular weight (Mw) of a material, such as a hydroxyl polymer is determined by Gel Permeation Chromatography (GPC) using a mixed bed column A high performance liquid chromatograph (HPLC) having the following components: Millenium®, Model 600E pump, system controller and controller software Version 3.2, Model 717 Plus autosampler and CHM-009246 column heater, all manufactured by Waters Corporation of Milford, Mass., USA, is utilized. The column is a PL gel 20 μm Mixed A column (gel molecular weight ranges from 1,000 g/mol to 40,000,000 g/mol) having a length of 600 mm and an internal diameter of 7.5 mm and the guard column is a PL gel 20 μm, 50 mm length, 7.5 mm ID. The column temperature is 55° C. and the injection volume is 200 μL. The detector is a DAWN® Enhanced Optical System (EOS) including Astra® software, Version 4.73.04 detector software, manufactured by Wyatt Technology of Santa Barbara, Calif., USA, laser-light scattering detector with K5 cell and 690 nm laser. Gain on odd numbered detectors set at 101. Gain on even numbered detectors set to 20.9. Wyatt Technology's Optilab® differential refractometer set at 50° C. Gain set at 10. The mobile phase is HPLC grade dimethylsulfoxide with 0.1% w/v LiBr and the mobile phase flow rate is 1 mL/min, isocratic. The run time is 30 minutes.

A sample is prepared by dissolving the material in the mobile phase at nominally 3 mg of material/1 mL of mobile phase. The sample is capped and then stirred for about 5 minutes using a magnetic stirrer. The sample is then placed in an 85° C. convection oven for 60 minutes. The sample is then allowed to cool undisturbed to room temperature. The sample is then filtered through a 5 µm Nylon membrane, type Spartan-25, manufactured by Schleicher & Schuell, of Keene, N.H., USA, into a 5 milliliter (mL) autosampler vial using a 5 mL syringe.

For each series of samples measured (3 or more samples of a material), a blank sample of solvent is injected onto the column. Then a check sample is prepared in a manner similar to that related to the samples described above. The check sample comprises 2 mg/mL of pullulan (Polymer Laboratories) having a weight average molecular weight of 47,300 g/mol. The check sample is analyzed prior to analyzing each set of samples. Tests on the blank sample, check sample, and material test samples are run in duplicate. The final run is a run of the blank sample. The light scattering detector and differential refractometer is run in accordance with the "Dawn EOS Light Scattering Instrument Hardware Manual" and "Optilab® DSP Interferometric Refractometer Hardware Manual," both manufactured by Wyatt Technology Corp., of Santa Barbara, Calif., USA, and both incorporated herein by reference.

The weight average molecular weight of the sample is calculated using the detector software. A dn/dc (differential change of refractive index with concentration) value of 0.066 is used. The baselines for laser light detectors and the refractive index detector are corrected to remove the contributions from the detector dark current and solvent scattering. If a laser light detector signal is saturated or shows excessive noise, it is not used in the calculation of the molecular mass. The regions for the molecular weight characterization are selected such that both the signals for the 90° detector for the laser-light scattering and refractive index are greater than 3 times their respective baseline noise levels. Typically the high molecular weight side of the chromatogram is limited by the refractive index signal and the low molecular weight side is limited by the laser light signal.

The weight average molecular weight can be calculated using a "first order Zimm plot" as defined in the detector software. If the weight average molecular weight of the sample is greater than 1,000,000 g/mol, both the first and second order Zimm plots are calculated, and the result with the least error from a regression fit is used to calculate the molecular mass. The reported weight average molecular weight is the average of the two runs of the material test sample.

λ Max Test Method

A sample of 0.1000 grams of a hueing agent is diluted to volume in a 100 mL volumetric flask using methanol. The absorbance and Lambda Max (λ Max) of the diluted hueing agent are measured from 400-750 nm using a spectrophotometer in a 1 cm cell. If this diluted hueing agent does not result in an absorbance maximum between 400-750 nm of between 0.1 and 1.0, an appropriate volume of this diluted hueing agent (between 1.0 mL and 10.0 mL) of this diluted hueing agent are transferred to a second 100 mL volumetric flask and further diluted to volume with methanol such that the final absorbance maximum between 400-750 nm is between 0.1 and 1.0. λ Max is then taken directly from the spectra.

Dry Tensile Strength Test Method

Elongation (Stretch), Tensile Strength, TEA and Tangent Modulus are measured on a constant rate of extension tensile tester with computer interface (a suitable instrument is the EJA Vantage from the Thwing-Albert Instrument Co. Wet Berlin, N.J.) using a load cell for which the forces measured are within 10% to 90% of the limit of the load cell. Both the movable (upper) and stationary (lower) pneumatic jaws are fitted with smooth stainless steel faced grips, with a design suitable for testing 1 inch wide sheet material (Thwing-Albert item #733GC). An air pressure of about 60 psi is supplied to the jaws.

Eight usable units of fibrous structures are divided into two stacks of four usable units each. The usable units in each stack are consistently oriented with respect to machine direction (MD) and cross direction (CD). One of the stacks is designated for testing in the MD and the other for CD. Using a one inch precision cutter (Thwing-Albert JDC-1-10, or similar) take a CD stack and cut one, 1.00 in ±0.01 in wide by 3-4 in long stack of strips (long dimension in CD). In like fashion cut the remaining stack in the MD (strip's long dimension in MD), to give a total of 8 specimens, four CD and four MD strips. Each strip to be tested is one usable unit thick, and will be treated as a unitary specimen for testing.

Program the tensile tester to perform an extension test, collecting force and extension data at an acquisition rate of 20 Hz as the crosshead raises at a rate of 2.00 in/min (5.08 cm/min) until the specimen breaks. The break sensitivity is set to 80%, i.e., the test is terminated when the measured force drops to 20% of the maximum peak force, after which the crosshead is returned to its original position.

Set the gage length to 1.00 inch. Zero the crosshead and load cell. Insert the specimen into the upper and lower open grips such that at least 0.5 inches of specimen length is contained in each grip. Align specimen vertically within the upper and lower jaws, then close the upper grip. Verify specimen is aligned, then close lower grip. The specimen should be fairly straight between grips, with no more than 5.0 g of force on the load cell. Add a pre-tension force of 3 g. This tension is applied to the specimen to define the adjusted gauge length, and, by definition is the zero strain point. Start the tensile tester and data collection. Repeat testing in like fashion for all four CD and four MD specimens. Program the software to calculate the following from the constructed force (g) verses extension (in) curve.

Eight samples are run on the Tensile Tester (four to the MD and four to the CD) and average of the respective dry total tensile, dry peak TEA and dry Fail Stretch is reported as the Dry Total Tensile, Dry peak TEA and Dry Fail Stretch. Peak TEA is defined as tensile energy absorbed (area under the load vs. strain tensile curve) from zero strain to peak force point, with units of g/M. Dry Fail Stretch is defined as the percentage strain measured after the web is strained past its peak load point, where the force drops to exactly 50% of its peak load force.

The dry peak TEA is then normalized for the basis weight of the strip from which it was tested. The normalized basis weight used is 24 g/m², and is calculated as follows:

Normalized{dry peak TEA}={dry peak TEA}*24 (g/m²)/Basis Weight of Strip (g/m²)

The MD and CD dry tensile strengths are determined using the above equipment and calculations in the following manner.

Tensile Strength in general is the maximum peak force (g) divided by the specimen width (1 in), and reported as g/M to the nearest 1 g/in.

Average Tensile Strength=sum of tensile loads measures (MD)/(Number of tensile stripes tested (MD)*Number of useable units or plys per tensile stripe)

This calculation is repeated for cross direction testing.

Dry Total Tensile=Average MD tensile strength+ Average CD tensile strength

The Dry Tensile value is then normalized for the basis weight of the strip from which it was tested. The normalized basis weight used is 24 g/m², and is calculated as follows:

Normalized{DTT}={DTT}*24 (g/m²)/Basis Weight of Strip (g/m²)

The various values are calculated for the four CD specimens and the four MD specimens. Calculate an average for each parameter separately for the CD and MD specimens.
Shear Viscosity of a Polymer Melt Composition Measurement Test Method The shear viscosity of a polymer melt composition comprising a crosslinking system is measured using a capillary rheometer, Goettfert Rheograph 6000, manufactured by Goettfert USA of Rock Hill S.C., USA. The measurements are conducted using a capillary die having a diameter D of 1.0 mm and a length L of 30 mm (i.e., L/D=30). The die is attached to the lower end of the rheometer's 20 mm barrel, which is held at a die test temperature of 75° C. A preheated to die test temperature, 60 g sample of the polymer melt composition is loaded into the barrel section of the rheometer. Rid the sample of any entrapped air. Push the sample from the barrel through the capillary die at a set of chosen rates 1,000-10,000 seconds⁻¹. An apparent shear viscosity can be calculated with the rheometer's software from the pressure drop the sample experiences as it goes from the barrel through the capillary die and the flow rate of the sample through the capillary die. The log (apparent shear viscosity) can be plotted against log (shear rate) and the plot can be fitted by the power law, according to the formula $\eta = K\gamma^{n-1}$, wherein K is the material's viscosity constant, n is the material's thinning index and γ is the shear rate. The reported apparent shear viscosity of the composition herein is calculated from an interpolation to a shear rate of 3,000 sec⁻¹ using the power law relation.
Polymer Melt Composition pH Test Method A polymer melt composition pH is determined by adding 25 mL of the polymer melt composition to 100 mL of deionized water, stirring with a spatula for 1 min and measuring the pH.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A roll of multi-ply toilet tissue useful as a wiping implement for post-urinary and post-bowel movement cleaning, wherein the roll of multi-ply toilet tissue comprises two or more fibrous structure plies combined together with a glue, wherein at least one of the fibrous structure plies comprises a fibrous structure, wherein the fibrous structure comprises both a plurality of fibers consisting of pulp fibers and a scrim material comprising a plurality of crosslinked filaments comprising one or more filament-forming polymers and one or more hueing agents comprising a dye present within the crosslinked filaments during use of the roll of multi-ply toilet tissue such that the fibrous structure exhibits a Whiteness Index of greater than 72 as measured by the Whiteness Index Test Method during use, and wherein the roll of multi-ply toilet tissue is flushable after use and wherein the scrim material is present in the fibrous structure at a basis weight of greater than 0.1 g/m² to less than 10 g/m², wherein the crosslinked filaments are formed from an aqueous polymer melt composition comprising the filament-forming polymer, a crosslinking agent comprising an imidazolidinone and an ammonium alkylsulfonate salt derived from an acid selected from the group consisting of: methanesulfonic acid, ethanesulfonic acid, propanesulfonic acid, isopropylsulfonic acid, butanesulfonic acid, isobutylsulfonic acid, sec-butylsulfonic acids, and trifluoromethanesulfonic acid, and mixtures thereof, wherein the ammonium alkylsulfonate salt is present within the fibrous element formed from the aqueous polymer melt composition and wherein the fibrous element is cured at a curing temperature of from about 110° C. to about 215° C.

2. The roll of multi-ply toilet tissue according to claim 1 wherein the dye is selected from the group consisting of: acridines, anthraquinones, azines, azos, azoles, benzodifuranes, benzodifuranones, carotenoids, coumarins, cyanines, diazahemicyanines, diphenylmethanes, formazans, hemicyanines, indigoids, methanes, naphthalimides, naphthoquinones, nitros, nitrosos, oxazines, phthalocyanines, pyrazoles, pyrazolines, stilbenes, styryls, triarylmethanes, triphenylmethanes, xanthenes, carboxylic acids, dibenzothiophene dioxides, other 5- and 6-membered-ring heterocycles, and mixtures thereof.

3. The roll of multi-ply toilet tissue according to claim 1 wherein the dye comprises a small molecule dye selected from the group consisting of: dyes falling into the Colour Index (C.I.) classifications of Direct Blue, Direct Red, Direct Violet, Acid Blue, Acid Red, Acid Violet, Acid Black, Basic Blue, Basic Violet and Basic Red, Reactive, Hydrolyzed Reactives, Solvent, Disperse, Food, and mixtures thereof.

4. The roll of multi-ply toilet tissue according to claim 1 wherein the dye is selected from the group consisting of: fibrous structure-substantive colorants, dye-polymer conjugates formed from at least one reactive dye and a polymer selected from the group consisting of polymers comprising a moiety selected from the group consisting of a hydroxyl moiety, a primary amine moiety, a secondary amine moiety, a thiol moiety, and mixtures thereof.

5. The roll of multi-ply toilet tissue according to claim 4 wherein the dye is selected from the group consisting of: Violet CT, Violet DD, Violet V200, Liquitint Violet ION, Permalite Fast Violet B, carboxymethyl cellulose conjugated with a reactive blue dye, carboxymethyl cellulose conjugated with a reactive violet dye, carboxymethyl cellulose conjugated with a reactive red dye, alkoxylated polymeric colorants comprising substituted benzodifuranes, methines, triphenylmethanes, naphthalimides, pyrazoles, naphthoquinones, anthraquinones, thiophenes, thiazoliums, azos, and mixtures thereof.

6. The roll of multi-ply toilet tissue according to claim 1 wherein at least one of the filament-forming polymers comprises a hydroxyl polymer.

7. The roll of multi-ply toilet tissue according to claim 6 wherein the hydroxyl polymer is selected from the group consisting of: polyvinyl alcohol, starch, starch derivatives, cellulose, cellulose derivatives, carboxymethylcellulose, hemicellulose, hemicelluloses derivatives, and mixtures thereof.

8. The roll of multi-ply toilet tissue according to claim 7 wherein the hydroxyl polymer is starch.

9. The roll of multi-ply toilet tissue according to claim 1 wherein at least one of the plurality of crosslinked filaments comprises a polyacrylamide.

10. The roll of multi-ply toilet tissue according to claim 1 wherein at least one of the plurality of crosslinked filaments exhibits an average diameter of less than 50 μm as measured according to the Average Diameter Test Method.

11. The roll of multi-ply toilet tissue according to claim 1 wherein the fibrous structure comprises at least one filament that comprises at least one different hueing agent from the other crosslinked filaments.

12. The roll of multi-ply toilet tissue according to claim 1 wherein the pulp fibers comprise wood pulp fibers.

13. The roll of multi-ply toilet tissue according to claim 12 wherein the wood pulp fibers are selected from the group consisting of: hardwood pulp fibers, softwood pulp fibers, and mixtures thereof.

14. The roll of multi-ply toilet tissue according to claim 1 wherein the plurality of crosslinked filaments are in contact with the pulp fibers.

15. The roll of multi-ply toilet tissue according to claim 14 wherein the pulp fibers comprise wood pulp fibers.

16. The roll of multi-ply toilet tissue according to claim 15 wherein the wood pulp fibers are selected from the group consisting of: hardwood pulp fibers, softwood pulp fibers, and mixtures thereof.

17. The roll of multi-ply toilet tissue according to claim 1 wherein the fibrous structure exhibits a Relative Hue Angle of from about 220° to about 330° as measured according to the Hue Angle Test Method.

18. The roll of multi-ply toilet tissue according to claim 1 wherein at least one of the plurality of crosslinked filaments further comprises a compatibilizing agent.

19. The roll of multi-ply toilet tissue according to claim 1 wherein the two or more fibrous structures comprise different hueing agents.

20. The roll of multi-ply toilet tissue according to claim 1 wherein the fibrous structure exhibits a Relative Hue Angle different by at least 5 degrees from a different fibrous structure within the roll of multi-ply toilet tissue as measured by the Hue Angle Test Method.

\* \* \* \* \*